(12) United States Patent
Boudreau et al.

(10) Patent No.: US 10,327,256 B2
(45) Date of Patent: Jun. 18, 2019

(54) DEVICE-TO-DEVICE COMMUNICATION WITH LONG-TERM RESOURCE ALLOCATION

(71) Applicant: Telefonaktiebolaget LM Ericsson (Publ), Stockholm (SE)

(72) Inventors: Gary Boudreau, Kanata (CA); Min Dong, Whitby (CA); Ruhalla Ali Hemmati, Toronto (CA); Ben Liang, Whitby (CA); Hossein Seyedmehdi, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/572,637

(22) PCT Filed: Sep. 13, 2016

(86) PCT No.: PCT/IB2016/055452
§ 371 (c)(1),
(2) Date: Nov. 8, 2017

(87) PCT Pub. No.: WO2017/064579
PCT Pub. Date: Apr. 20, 2017

(65) Prior Publication Data
US 2018/0146490 A1   May 24, 2018

Related U.S. Application Data

(60) Provisional application No. 62/242,080, filed on Oct. 15, 2015, provisional application No. 62/294,128, filed on Feb. 11, 2016.

(51) Int. Cl.
*H04L 5/00* (2006.01)
*H04W 52/02* (2009.01)
(Continued)

(52) U.S. Cl.
CPC ....... *H04W 72/1231* (2013.01); *H04L 5/0033* (2013.01); *H04W 52/0216* (2013.01);
(Continued)

(58) Field of Classification Search
CPC ...... H04W 88/02; H04W 24/02; H04W 48/02
See application file for complete search history.

(56) References Cited

U.S. PATENT DOCUMENTS 10,009,904 B2 *   6/2018   Wang ................ H04W 72/1226
2010/0261469 A1  10/2010   Ribeiro et al.
2012/0051315 A1   3/2012   Wang et al.

FOREIGN PATENT DOCUMENTS

WO   2014/101179 A1   7/2014
WO   2015/060756 A1   4/2015

OTHER PUBLICATIONS

1International Preliminary Report on Patentability dated Jan. 24, 2018 issued in corresponding PCT Application Serial No. PCT/IB2016/055452, consisting of 26 pages.
(Continued)

*Primary Examiner* — Chandrahas B Patel
(74) *Attorney, Agent, or Firm* — Christopher & Weisberg, P.A.

(57) ABSTRACT

The disclosure provides a method and network entity for scheduling a device-to-device (D2D) wireless device using resource blocks (RBs) of active cellular wireless devices in a wireless network. The method includes determining a power allocation for each of the RBs based on achieving a target rate for the D2D wireless device and the active cellular wireless devices, and scheduling the D2D wireless device based on the determined power allocation.

20 Claims, 8 Drawing Sheets

(51) Int. Cl.
  H04W 52/24 (2009.01)
  H04W 52/38 (2009.01)
  H04W 72/04 (2009.01)
  H04W 72/12 (2009.01)
  H04W 52/22 (2009.01)
  H04W 72/08 (2009.01)

(52) U.S. Cl.
  CPC ....... H04W 52/243 (2013.01); H04W 52/383 (2013.01); H04W 72/048 (2013.01); H04W 72/0473 (2013.01); H04W 72/121 (2013.01); H04W 72/1215 (2013.01); H04W 52/225 (2013.01); H04W 72/082 (2013.01); H04W 72/1226 (2013.01); Y02D 70/00 (2018.01); Y02D 70/1226 (2018.01); Y02D 70/1242 (2018.01); Y02D 70/1262 (2018.01); Y02D 70/1264 (2018.01); Y02D 70/142 (2018.01); Y02D 70/21 (2018.01)

(56) References Cited

OTHER PUBLICATIONS

Daohua Zhu et al. "Downlink Resource Reuse for Device-to-Device Communications Underlaying Cellular Networks," Published May 2014, IEEE Signal Processing Letters (vol. 21, No. 5) (pp. 531-534), consisting of 4-pages.

Daquan Feng et al. "Device-to-Device Communications Underlaying Cellular Networks," Published Aug. 2013, IEEE Transactions on Communications (vol. 61, No. 8) (pp. 3541-3551), consisting of 11-pages.

Rui Yin et al., "Joint Spectrum and Power Allocation for D2D Communications Underlaying Cellular Networks," Published Apr. 2015, Citation information: DOI 10.1109TVT.2015.2424395, IEEE Transactions on Vehicular Technology (pp. 1519-1532), consisting of 14-pages.

Feiran Wang et al. "Energy-Efficient Resource Allocation for Device-to-Device Underlay Communication," Published Apr. 2015, IEEE Transactions on Wireless Communications, (vol. 14, No. 4), consisting of 11-pages.

Rui Yin et al. "Pricing-Based Interference Coordination for D2D Communications in Cellular Networks", Published Mar. 2015, IEEE Transactions on Wireless Communications (vol. 14, No. 3), consisting of 14-pages.

Yong Li et al., "Coalitional Games for Resource Allocation in the Device-to-Device Uplink Underlaying Cellular Networks", Published Jul. 2014, IEEE Transactions on Wireless Communications (vol. 13, No. 7) (pp. 3965-3977) consisting of 13-pages.

Hualiang Chen et al. "Coalition Formation Game for Green Resource Management in D2D Communications," Published Aug. 2014, IEEE Communications Letters (vol. 18, No. 8) (pp. 1395-1398) consisting of 4-pages.

Chen Xu et al. "Efficiency Resource Allocation for Device-to-Device Underlay Communication Systems: A Reverse terative Combinatorial Auction Based Approach," Published Sep. 2013, IEEE Journal on Selected Areas in Communications/Supplement (pp. 348-358), consisting of 11-pages.

Klaus Doppler et al. "Device-to-Device Communication as an Underlay to LTE-Advanced Networks", Published Dec. 2009, IEEE Communications Magazine—Topics in Radio Communications (pp. 42-49), consisting of 8-pages.

Gabor Fodor et al., "Design Aspects of Network Assisted Device-to-Device Communications", Published Mar. 2012, IEEE Communications Magazine—Accepted From Open Call (pp. 170-177), consisting of 8-pages.

Hyunkee Min, et al. "Capacity Enhancement Using an Interference Limited Area for Device-to-Device Uplink Underlaying Cellular Networks" Published Dec. 2011, IEEE Transactions on Wireless Communications (vol. 10, No. 12) (pp. 3995-4000), consisting of 6-pages.

Ali Ramezani-Kebrya et al., "Optimal Power Allocation in Device-to-Device Communication with SIMO Uplink Beamforming," Published Jun. 2015, IEEE International Workshop on Signal Processing Advances in Wireless Communications (SPAWC), (pp. 425-429), consisting of 5-pages.

Xingqin Lin et al., "An Overview of 3GPP Device-to-Device Proximity Services," Published Apr. 2014, IEEE Communications Magazine—Smart-Device-To-Smart-Device Communications (pp. 40-48), consisting of 9-pages.

Wei Zhong et al, "Joint Resource Allocation for Device-to-Device Communications Underlaying Uplink MIMO Cellular Networks", Published Jan. 2015, IEEE Journal on Selected Areas in Communications (vol. 33, No. 1) (pp. 41-54), consisting of 14-pages).

Chia-Hao Yu et al., "Resource Sharing Optimization for Device-to-Device Communication Underlaying Cellular Networks," Published Aug. 2011 (vol. 10, No. 8) (pp. 2752-2763), consisting of 12-pages.

International Search Report and Written Opinion issued by the International Searching Authority dated Jun. 9, 2016 in corresponding PCT Application Serial No. PCT/IB2016/051347, consisting of 12-pages.

Stephen Boyd, Lieven Vandenberghe "Convex Optimization," Published 2004, Cambridge University Press, Section 6.5.5 "Function Fitting and Interpolation", consisting of 13-pages.

International Search Report & Written Opinion of the International Searching Authority dated Dec. 8, 2016 issued in PCT Application Serial PCT/IB2016/055452, consisting of 11-pages.

\* cited by examiner

DEVICE-TO-DEVICE COMMUNICATION WITH LONG-TERM RESOURCE ALLOCATION

CROSS-REFERENCE TO RELATED APPLICATIONS

This application is a Submission Under 35 U.S.C. § 371 for U.S. National Stage Patent Application of International Application Number: PCT/IB2016/055452, filed Sep. 13, 2016 entitled "DEVICE-TO-DEVICE COMMUNICATION WITH LONG-TERM RESOURCE ALLOCATION," which claims priority to U.S. Provisional Application Nos. 62/242,080, filed Oct. 15, 2015, entitled "DEVICE-TO-DEVICE COMMUNICATION WITH LONG-TERM RESOURCE ALLOCATION," and 62/294,128, filed Feb. 11, 2016, entitled "DEVICE-TO-DEVICE COMMUNICATION WITH LONG-TERM RESOURCE ALLOCATION," the entireties of all of which are incorporated herein by reference.

TECHNICAL FIELD

The present disclosure relates to device-to-device (D2D) communications, and in particular to scheduling a D2D device on resource blocks (RBs) of existing cellular devices in a network that is scheduling both cellular and D2D devices and optimizing the capacity of D2D underlays on legacy cellular networks with simultaneous D2D and legacy wireless device transmissions.

BACKGROUND

In order to achieve high data rates, several technologies including Evolved Universal Mobile Telecommunications System (UMTS) terrestrial radio access (EUTRA) and EUTRA network (EUTRAN) have been developed in the Third Generation Partnership Project (3GPP) Long Term Evolution (LTE) set of standards. Furthermore, local service requirements have led to the development of newer technologies in LTE-Advanced and are being proposed for "5G" implementations.

In order to provide local services, one approach is to use license exempt spectrum of wireless local area networks (WLANs). Another approach is data transmission on a licensed band in a coordinated and planned network. Regarding this latter approach, device-to-device (D2D) communication has been studied extensively, where wireless devices in proximity to one another can transmit data directly to each other with reused cellular resource blocks. Thus, in a D2D communication scenario, two wireless devices, such as user equipments (UEs), directly communicate with each other without having the payload traverse the backhaul network. Due to its local communication nature, D2D communication can be provided with smaller fees compared to the fees for cellular communication. D2D communication provides many benefits that cannot be provided by uncoordinated communication.

D2D communications provide a number of advantages. These are summarized as follows:
  The overall network spectral efficiency can be improved significantly with an optimal configuration as compared with other communication technologies.
  Low delay and low power consumption due to the proximity of wireless devices.
  Improved radio resource utilization because of resource reuse by both cellular wireless devices and D2D pairs simultaneously.
  Using one link for direct communication, instead of one uplink and one downlink for communication through the base station, reduces resource usage.
  Offloading cellular traffic to D2D traffic reduces congestion in the backhaul network, benefiting existing cellular wireless devices in the network.

There are many current and prospective applications for D2D communications. For example, D2D communications has been proposed for use in LTE-based public safety networks in the United States for its security and reliability. In addition, D2D communication is necessary for scenarios where the cellular transmission is not accessible.

In commercial networks, many social network applications require recognition of nearby wireless devices. Proximity wireless device recognition is usually handled in a centralized manner, where wireless devices are required to register their location information in a server such that the location information can be shared among the other wireless devices, e.g., in various social networking sites. With D2D, location registration is no longer required for the purpose of proximity discovery. Another prospective application for D2D communication is E-commerce, where nearby agencies need to transfer efficiently a large amount of private data.

One challenge of D2D communication is interference with coexisting cellular devices.

For a cellular network that includes D2D devices, interference needs to be carefully controlled because cellular devices and D2D devices share the spectrum. In order to manage the interference to the cellular devices in the same cell, several approaches have been proposed such as limiting D2D transmission power, for example, by employing a fixed booster factor and a back-off factor to adjust the D2D power.

In practical multi-cell networks, inter-cell interference (ICI) is a challenge that has not been addressed in the D2D literature. The ICI depends on the duplexing scheme used by cellular and D2D devices and the resources blocks shared between D2D and cellular devices.

Establishing direct communication between two nodes, or even among a set of nearby nodes in the Long Term Evolution (LTE) networks, is a way to enhance the spectral efficiency of the cellular network. Achieving potential improvements of D2D communication depends on efficiently addressing the resource and power allocation problems. Proposed solutions to these problems have proven inadequate. In a realistic cellular environment, there are multiple cellular devices and D2D pairs that attempt to access a shared resource pool. Normally, each node has access to multiple Resource Blocks (RBs) and also each RB is allocated to multiple interfering devices between cells (i.e., resource reuse among neighboring cells). Furthermore, either uplink or downlink resources can be used by D2D communication. Any realistic D2D resource allocation formulation should consider the aforementioned factors. No existing work has formulated all of these factors. Many studies propose simple heuristics that give highly suboptimal performance, while the available optimal solutions are achieved under simplified cellular communication models.

D2D communication can cause significant ICI in neighboring cells. Current methods are not designed to maximize the combined sum rate of the cellular and D2D devices with a limit on the maximum ICI generated in the neighboring cell.

The D2D communication may be bi-directional communication where both devices receive and transmit in the same or different resources. However, D2D communication may also comprise scenarios in which one of the devices transmits and the other one receives the signals. There may also exist a point-to-multipoint (e.g. multicast, broadcast) scenario in which case a plurality of devices receive signals from the same transmitting device. This scenario is particularly useful for emergency services or public safety operation to spread vital information to several devices in an affected area. Of note, the terms D2D communication and D2D operation are interchangeably used herein.

Typically, wireless devices operate under the supervision of a radio access network with radio access nodes (e.g., base stations). However, in some scenarios the wireless devices themselves establish direct communication constituting the radio access network without the intervention of the network infrastructure.

In cellular network assisted device-to-device communications (or simply network assisted D2D communications), wireless devices in the vicinity of each other can establish a direct radio link, i.e., a D2D bearer. While wireless devices communicate over the D2D "direct" bearer, they also maintain a cellular connection with their respective serving base station (eNB). This direct link is interchangeably denoted as a network (NW) link, or a D2D-NW link. The NW link is used for resource assignment for D2D communication as well as maintenance of radio link quality of D2D communication link. As such, D2D communication is a promising feature that can potentially scale the capacity of the cellular networks.

Three relevant coverage scenarios for D2D communication have been defined as shown in FIG. 1. FIG. 1 is a block diagram of a wireless communication system 10 that includes a base station 12 that serves wireless devices in a region of coverage of the base station 12. The wireless devices may include two D2D wireless devices 14a and 14b, which may share physical resource blocks ("PRB s"). Throughout this disclosure, the term "D2D wireless device 14" shall refer to an individual D2D wireless device, i.e., either wireless device 14a or wireless device 14b. The term "D2D wireless device 14 pair" shall refer to both wireless device 14a and wireless device 14b. FIG. 1 also shows a cellular wireless device 16 in communication with the base station 12 and possibly also in communication with a D2D wireless device 14b. Note that herein a base station is but one example of base station 12. Implementations are not limited solely to base stations.

FIG. 2 is a block diagram of the wireless communication system 10 showing multiple base stations 12 each having a separate coverage area 18. In FIGS. 1 and 2, the solid connecting lines depict desired cellular or D2D transmissions, and the dotted connecting lines depict examples of interference from other cellular and D2D wireless devices.

In coverage: In this coverage scenario, all communicating D2D wireless device 14 pairs are within the network coverage. For example, the D2D wireless device 14 pairs can receive signals from and/or transmit signals to at least one network node such as the base station 12. In this case, the D2D wireless device 14 pairs can maintain a communication link with the network 10. The network 10 in turn can ensure that the D2D communication does not cause unnecessary interference. In coverage is also interchangeably referred to as in-network (IN) coverage.

Out of coverage: In this scenario, D2D wireless device 14 pairs communicating with each other are not under network node coverage. For example, the D2D wireless device 14 pairs cannot receive signals from and/or transmit signals to any of the network nodes. Typically the lack of coverage is due to complete absence of the network coverage in the vicinity of the D2D wireless device 14 pair. However, the lack of coverage may also be due to insufficient resources in the network nodes to serve or manage the D2D wireless device 14 pair. Therefore, in this scenario, the network cannot provide any assistance to the D2D wireless device 14 pairs. The out of coverage is also interchangeably referred to as out-of-network (OON) coverage.

Partial coverage: In this scenario, at least one communicating D2D wireless device 14 pair is within network coverage, and at least one other D2D wireless device 14 pair is not under network coverage, but is communicating with a D2D wireless device 14 that is under network coverage. As mentioned above, the D2D wireless device 14 not being under network coverage can be due to lack of any network node in its vicinity or due to insufficient resources in any of the network nodes in its vicinity. The partial coverage is also interchangeably called partial-network (PN).

SUMMARY

The present disclosure advantageously provides a method and system for scheduling a D2D device on resource blocks (RBs) of existing cellular devices in a network that is scheduling both cellular and D2D devices. This enables improvement in spectral efficiency over networks that schedule D2D devices and cellular devices on orthogonal resources. This disclosure describes a method to ostensibly improve the throughput of a D2D device while satisfying a long-term power constraint for the D2D device. It also ensures that the probability that the signal to noise-plus-interference ratio (SINR) being below a target threshold level is less than a pre-defined small value for a legacy cellular or wireless access network (WAN) device sharing the same physical resource blocks (PRBs) within the same cell or the neighboring cells, and, thus assuring a specific long-term Quality of Service (QoS) for the interfering cellular devices in the main cell and also neighboring cells.

According to one aspect of the disclosure, a method for scheduling a D2D wireless device using RBs of active cellular wireless devices in a wireless network is provided. In one embodiment, the method includes determining a power allocation for each of the RBs based on achieving a target rate for the D2D wireless device and the active cellular wireless devices, and scheduling the D2D wireless device based on the determined power allocation.

According to one embodiment of this aspect, the method further includes determining a cellular wireless device of the active cellular wireless devices to be matched with the D2D wireless device pair, allowing the D2D wireless device to share all RBs allocated to the cellular wireless device that is matched with the D2D wireless device pair, determining a power allocation for each RB of the allocated RBs based on achieving a target rate for the D2D wireless device and the cellular wireless device to which the D2D wireless device pair is matched, and scheduling the D2D wireless device based on the allocated RBs based on the determined power allocation.

According to another embodiment of this aspect, achieving the target rate for the D2D wireless device and the cellular device to which the D2D wireless device pair is matched satisfies constraints on a power of the D2D wireless device and a SINR of interfering cellular wireless devices in one of a main cell and a neighboring cell.

According to another embodiment of this aspect, the method further includes obtaining feedback information from each interfering cellular device in one of a main cell and a neighboring cell and at least one of forwarding the feedback information to the D2D wireless device and instructing the D2D wireless device to adjust power over each RB based on the feedback information.

According to another embodiment of this aspect, if the feedback information indicates conflicting power adjustments over each RB, the method further includes instructing the D2D wireless device to at least one of decrease power over each RB in order to satisfy constraints on a SINR of interfering cellular wireless devices in one of a main cell and a neighboring cell and increase power over each RB in order to satisfy constraints on a SINR of interfering cellular wireless devices in one of a main cell and a neighboring cell. According to another embodiment of this aspect, the feedback information is comprised of one data bit.

According to another embodiment of this aspect, adjusting the power over each RB includes one of increasing the power over each RB which satisfies constraints on power, and decreasing the power over each RB which satisfies constraints on a SINR of interfering cellular wireless devices in one of a main cell and a neighboring cell.

According to another embodiment of this aspect, the method further includes determining a sign of a subgradient value which is related to SINR constraints of interfering cellular wireless devices in one of a main cell and a neighboring cell, the determining based on the feedback information. According to another embodiment of this aspect, the method further includes using time averaging as an approximation for statistical mean to approximate the subgradient value.

According to another embodiment of this aspect, the method further includes calculating a target level of power over each RB of the allocated RBs to meet a time averaged signal to SINR for an interfering cellular wireless device in one of a main cell and a neighboring cell. According to another embodiment of this aspect, the target level of power is calculated to meet the time averaged SINR with a pre-specified probability.

According to another embodiment of this aspect, the method further includes using average channel measurements over a predetermined period of time to determine the cellular wireless device to be matched with the D2D wireless device pair.

According to another aspect of the disclosure, a network entity configured to schedule a D2D wireless device using RBs of active cellular wireless devices in a wireless network is provided. In one embodiment the network entity includes a communications interface, and processing circuitry including a memory and a processor, the memory in communication with the processor, the memory having instructions that, when executed by the processor, configure the processor to determine a power allocation for each of the RBs based on achieving a target rate for the D2D wireless device and the active cellular wireless devices, and schedule the D2D wireless device based on the determined power allocation.

According to an embodiment of this aspect, the processor is further configured to determine a cellular wireless device of the active cellular wireless devices to be matched with the D2D wireless device pair, allow the D2D wireless device to share all RBs allocated to the cellular wireless device that is matched with the D2D wireless device pair, determine a power allocation for each RB of the allocated RBs based on achieving a target rate for the D2D wireless device and the cellular wireless device to which the D2D wireless device pair is matched, and schedule the D2D wireless device based on the allocated RBs based on the determined power allocation.

According to another embodiment of this aspect, achieving the target rate for the D2D wireless device and the cellular device to which the D2D wireless device pair is matched satisfies constraints on a power of the D2D wireless device and a SINR of interfering cellular wireless devices in one of a main cell and a neighboring cell.

According to another embodiment of this aspect, the processor is further configured to obtain feedback information from each interfering cellular device in one of a main cell and a neighboring cell, and the communications interface is further configured to at least one of forward the feedback information to the D2D wireless device and instruct the D2D wireless device to adjust power over each RB based on the feedback information.

According to another embodiment of this aspect, if the feedback information indicates conflicting power adjustments over each RB, the processor is further configured to instruct the D2D wireless device to at least one of decrease power over each RB in order to satisfy constraints on a SINR of interfering cellular wireless devices in one of a main cell and a neighboring cell and increase power over each RB in order to satisfy constraints on a SINR of interfering cellular wireless devices in one of a main cell and a neighboring cell. According to another embodiment of this aspect, the feedback information is comprised of one data bit.

According to another embodiment of this aspect, adjusting the power over each RB includes one of increasing the power over each RB which satisfies constraints on power, and decreasing the power over each RB which satisfies constraints on a SINR of interfering cellular wireless devices in one of a main cell and a neighboring cell.

According to another embodiment of this aspect, the processor is further configured to determine a sign of a subgradient value which is related to SINR constraints of interfering cellular wireless devices in one of a main cell and a neighboring cell, the determining based on the feedback information. According to another embodiment of this aspect, the processor is further configured to use time averaging as an approximation for statistical mean to approximate the subgradient value.

According to another embodiment of this aspect, the processor is further configured to calculate a target level of power over each RB of the allocated RBs to meet a time averaged SINR for an interfering cellular wireless device in one of a main cell and a neighboring cell. According to another embodiment of this aspect, the target level of power is calculated to meet the time averaged SINR with a pre-specified probability.

According to another embodiment of this aspect, the processor is further configured to use average channel measurements over a predetermined period of time to determine the cellular wireless device to be matched with the D2D wireless device pair.

According to another aspect of this disclosure, a network entity configured to schedule a D2D wireless device using RBs of active cellular wireless devices in a wireless network is provided. In one embodiment, the network entity includes a communications module, a processing module, a power allocation module configured to determine a power allocation for each of the RBs based on achieving a target rate for the D2D wireless device and the active cellular wireless devices, and a scheduling module configured to schedule the D2D wireless device based on the determined power allocation.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
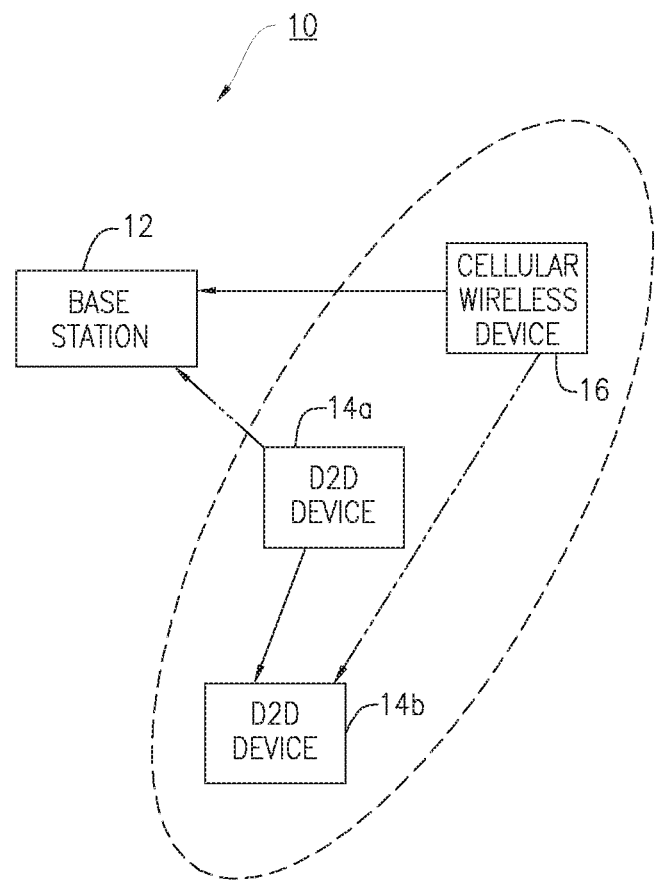
FIG. 1 is a block diagram of a wireless network supporting D2D communications illustrating D2D wireless devices and cellular wireless devices served by a base station, sharing PRBs.
Figure 2:
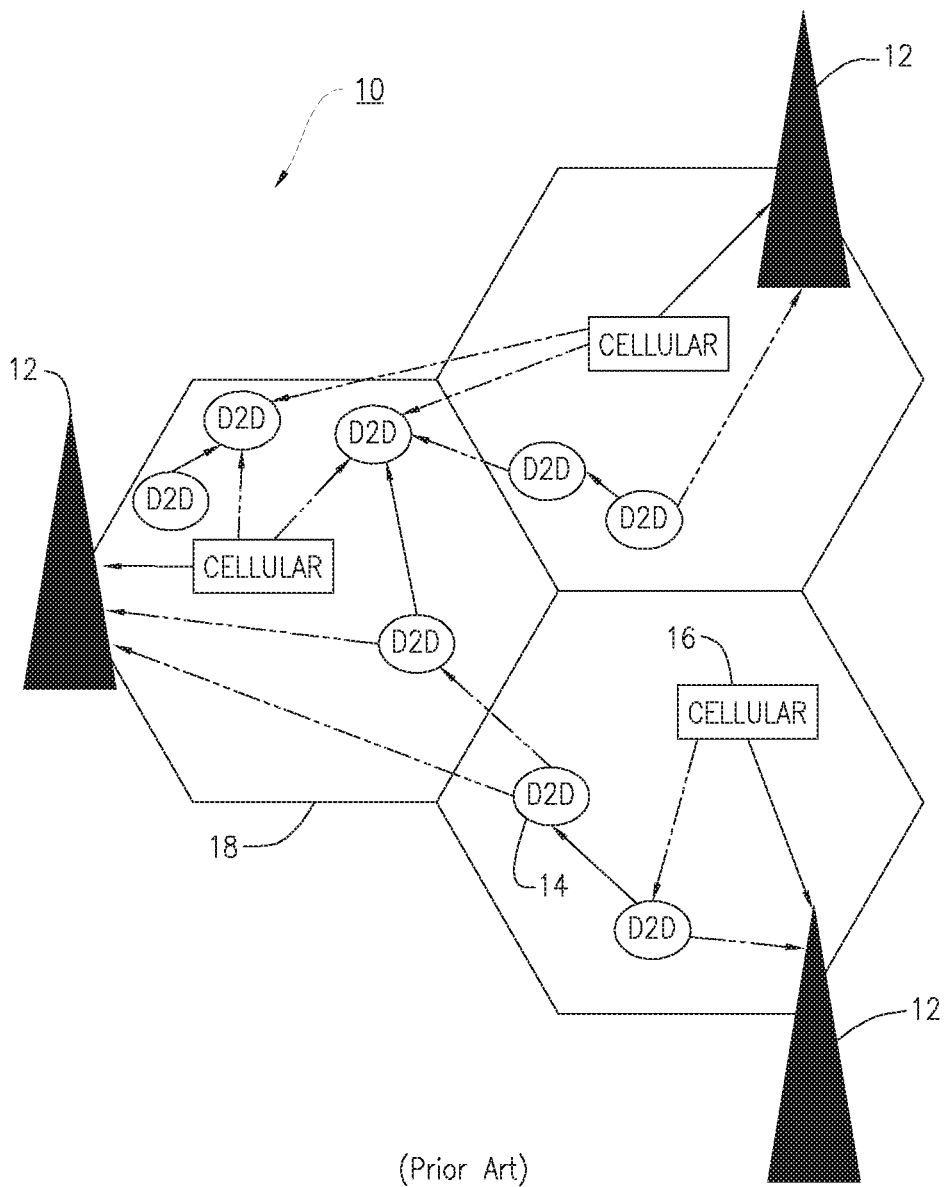
FIG. 2 is a block diagram of a wireless network supporting D2D communications illustrating an example of D2D and cellular transmissions with neighboring cells.

The present disclosure includes embodiments which can be implemented in a network node and a network capable wireless device, such as a UE. The term "network entity" will be used herein to refer to a network node or a network capable wireless device. The network entity herein can be the serving network node of the wireless device or any network node with which the wireless device can establish or maintain a communication link and/or receive information, e.g., via broadcast channel. Specifically, network entity 12 can be any kind of network node which may comprise of a radio network node such as base station, radio base station, base transceiver station, base station controller, network controller, evolved Node B (eNB), Node B, Multi-cell/multicast Coordination Entity (MCE), relay node, access point (AP), radio access point, Remote Radio Unit (RRU) Remote Radio Head (RRH), a core network node (e.g., Mobile Management Entity (MME), Self-Organizing Network (SON) node, a coordinating node, positioning node, MDT node, etc.), or even an external node (e.g., 3rd party node, a node external to the current network), etc.

As used herein, a wireless device is not limited to a UE. A wireless device is any type of device that is configured or configurable for communication through wireless communication. Examples of such wireless devices are sensors, modems, smart phones, machine type (MTC) devices a.k.a. machine to machine (M2M) devices, Personal Data Assistants (PDAs), iPADs, Tablets, smart phones, laptop embedded equipped (LEE), laptop mounted equipment (LME), Universal Serial Bus (USB) dongles, etc.

The embodiments described herein also use a generic term "D2D wireless device" which includes a D2D transmitting device and a D2D receiving device. Of course, the roles may reverse depending on which device is transmitting and which is receiving at any given time. A D2D transmitting device and a receiving device can be any types of wireless devices which are capable of communication at least through wireless communication. Examples include are sensors, modems, smart phones, machine type (MTC) devices a.k.a. machine to machine (M2M) devices, PDAs, iPADs, Tablets, laptop embedded equipped (LEE), laptop mounted equipment (LME), USB dongles, etc.

Although terminology from 3GPP LTE (or Evolved Universal Terrestrial Access Network (E-UTRAN)) is used in this disclosure to describe the embodiments, this should not be seen as limiting the scope of the disclosure to only the aforementioned system. Other wireless systems, including Wide Band Code Division Multiple Access (WCDMA), Universal Mobile Telecommunications System (UMTS) Evolved Terrestrial Radio Access (UTRA)-Frequency Division Duplexing (FDD), UTRA Time Division Duplexing (TDD), and Global System for Mobile Communications (GSM) Edge Radio Access Network (GERAN)/EDGE, may also benefit from exploiting the ideas covered within this disclosure.

The embodiments are described when D2D wireless devices and cellular wireless devices are configured to be served by or operate with a single carrier (also known as single carrier operation of the wireless device) for communication or configured to use or operate a single carrier in a network node. However, the embodiments are also applicable for multi-carrier or carrier aggregation based communication.

This disclosure provides, in some embodiments, a method and arrangement for, as compared with known arrangements, efficiently scheduling a D2D wireless device on resource blocks (RBs) of existing cellular devices in a network that is scheduling both cellular wireless devices and D2D wireless devices. This enables improvement in spectral efficiency over networks that merely schedule D2D wireless devices and cellular devices on orthogonal resources.

This disclosure also provides, in some embodiments, a method and arrangement for, as compared with known arrangements, improving the throughput of a D2D wireless device while satisfying long-term power constraints for the D2D wireless device. The disclosure also ensures that the probability that the signal to noise-plus-interference ratio (SINR) level for a legacy cellular or wireless access network (WAN) device sharing the same physical resource blocks (PRBs) within the same cell or the neighboring cells is below a target threshold is less than a pre-defined small value and thus assure a specific long-term Quality of Service (QoS) for the interfering cellular wireless devices in the main cell and also neighboring cells.

The method and arrangements of such embodiments can be applied under the following assumptions.

An idle D2D wireless device pair requests capacity in a network consisting of active cellular wireless devices and D2D wireless device pairs.

Due to the localized and low-power transmission of D2D wireless device pairs, the resource planning (resource allocation and power control) of existing wireless devices in the network is not modified.

The new D2D wireless device pair will be matched with one of the active cellular wireless devices in the network, which means that the D2D wireless device pair and the cellular wireless device share all RBs allocated to a selected cellular wireless device.

It is assumed that there are N active cellular wireless devices and each cellular wireless device has access to multiple RBs.

The following summarizes proposed methods and arrangements according to some embodiments of the present disclosure in comparison with known methods and arrangements:

A difference between some embodiments of the present disclosure and other known methods is that in such embodiments of the present disclosure long-term throughput of D2D wireless device pairs and cellular wireless devices under a long-term power constraint for D2D wireless device pairs is improved, which confines the battery consumption, and long-term individual power constraints over each RB is improved in order to achieve a probabilistic SINR guarantee for all cellular wireless devices that share the same RBs with the D2D wireless device pairs.

Another difference between some embodiments of the present disclosure and other known methods is that in the embodiments of the present disclosure, the sum-rate of cellular wireless devices and D2D wireless device pairs is improved while in some known methods only the D2D wireless device pair rate is improved.

Some known methods introduce a heuristic method in which using time averaging instead of statistical mean solved the primal optimization problem in order to improve D2D rate. In some embodiments of the present disclosure, two more heuristic methods are introduced in which the time averaging approximation to the subgradient method is applied in the dual domain. Furthermore, some embodiments of the present disclosure disclose that by only using the sign of the approximated subgradient, the same performance results can almost be achieved. It should be noted that the concept of all three heuristic methods can be applied to both sum-rate and also D2D rate improvement approaches.

Some known methods only consider a single-RB scenario. In contrast, the methods and arrangements according to some embodiments disclosed herein assume that each node has access to a number of RBs. Some known methods only consider a single-cell scenario, while the methods and arrangements according to some embodiments disclosed herein consider constraints on the SINR of interfering wireless devices in the neighboring cells.

Some known methods attempt to compute the power allocation for a D2D wireless device and the corresponding cellular device at the same time. By contrast, the methods and arrangements according to some embodiments disclosed herein do not modify the scheduling of the cellular devices. Thus, the complexity of optimization arrangement may be substantially lower than with existing solutions.

There are also known arrangements that use game theory approaches for resource allocation. In contrast to the methods and arrangements according to some embodiments disclosed herein, those known arrangements propose methods that do not ensure that any network related metric will be optimized. Also, the disclosure herein considers a single-antenna, multi-RB system, while other known methods cover a multi antenna, single-RB system. Thus, the formulations of the two are distinct.

The following definitions are employed in the methods and arrangements according to some embodiments described herein. $C_i$ is defined as the set of all RBs dedicated to the $i^{th}$ cellular wireless device available to match with the D2D wireless device pair and $C \triangleq \cup N_{i=1}^N C_i$. For the $j^{th}$ RB, $S_j$ is defined as the set of all cellular wireless device located in the neighboring cells that are employing the $j^{th}$ RB.

The notations which are used throughout this disclosure are defined in Table I.

| | |
|---|---|
| N | The number of cellular wireless devices in each cell |
| C | set of all RBs in the network |
| $C_i$ | set of dedicated RBs to the $i^{th}$ cellular wireless device |
| $S_j$ | set of neighboring cellular wireless devices accessing to the $j^{th}$ RB |
| $p_{t,j}^D$ | D2D transmitted power over the $j^{th}$ RB |
| $p_{r,j}^C$ | cellular wireless device received power over the $j^{th}$ RB |
| $p_{r,j}^{(k)}$ | neighboring cellular wireless device received power over the $j^{th}$ RB (for $k \in S_j$) |
| $I_j$ | D2D received interference power over the $j^{th}$ RB |
| $p_{t,j}^D I'_j$ | cellular wireless device received interference power over the $j^{th}$ RB from the new D2D wireless device pair |
| $p_{t,j}^D I'_j^{(k)}$ | neighboring cellular wireless device received interference power over the $j^{th}$ RB (for $k \in S_j$) from the new D2D wireless device pair |
| $h_j$ | channel coefficient between the D2D wireless device pair over the $j^{th}$ RB |
| $I_j^0$ | cellular wireless device received interference power over the $j^{th}$ RB before admitting the new D2D wireless device pair |
| $I_j^{0,(k)}$ | neighboring cellular wireless device received interference power over the $j^{th}$ RB (for $k \in S_j$) before admitting the new wireless device D2D |
| $P_{max}^D$ | maximum available power for a D2D wireless device pair |
| $\zeta_{j,min}^{intra}$ | cellular wireless device minimum required SINR over the $j^{th}$ RB |
| $\zeta_{j,min}^{(k)}$ | neighboring cellular wireless device minimum required SINR over the $j^{th}$ RB (for $k \in S_j$) |
| $\sigma^2$ | noise power over each RB |
| $\eta_j$ | maximum power level which satisfies the SINR requirement for the cellular wireless devices sharing the $j^{th}$ RB |
| $\mu$ | Lagrange multiplier related to the sum power constraint |
| $\lambda_j$ | Lagrange multiplier related to the individual power constraint over the $j^{th}$ RB |
| $\epsilon$ | probability that the SINR for the cellular wireless device in the main cell and the neighboring cells is below a target threshold |
| $\omega$ | tuning factor for the Chernoff bound |

$$[x]_+ = \max(x, 0) \text{ and } [x]_a^b = \begin{cases} a & x < a \\ x & a \leq x \leq b \\ b & x > b \end{cases} \text{ is defined.}$$

$E\{x\}$ and $\bar{x}$ are used interchangeably.

$E_n\{x\}$ is defined as the time average over n consecutive samples, i.e., $\{x_1, x_2, \ldots, x_n\}$.

Pseudo Code for Finding the Best Cellular Match

For matching a D2D wireless device pair with one or more of the cellular wireless devices, the following steps are employed:

The power allocation for each RB is found such that the sum-rate is improved satisfying constraints on the sum-power of the D2D wireless device pair and also the SINR of the interfering cellular wireless device in the main cell and neighboring cells. This optimization is done by using expected values for all related channels.

The first step is done for all available cellular wireless devices in the network. Based on calculated achievable rates, the best cellular match is found.

The input of Algorithm 1a below is average "long term" channel measurement, which may be used to find the best cellular match. With respect to "long term," in general, when describing the response of a wireless channel, there is a notion of "coherence time" which is the interval over which the channel response (typically amplitude and phase) remains relatively constant. The term usually employed in communication theory is that the channel is "stationary" (i.e. the statistics or probability distribution of the channel random variables do not change over a given interval). One example related to the amplitude of the channel response is the time interval over which one would not expect a fade. The coherence time has no definitive value, but is typically defined as the time in which the average statistics change less than 20 or 30%. Typical channel coherence times are on the order of msec.

As used herein, the term "long term" means an interval of many "coherence times," i.e., tens of seconds or minutes or even hours over which the short term statistics can be averaged out and a "longer term" statistic can be employed. For example, the long term average of a signal SINR could be 10 dB, but the short term instantaneous SINR could be −5 dB, or +15 dB due to fading. Examples of the practical use of "long term" as described in this disclosure include being able to assure a certain quality of service over time (i.e., 10 dB SINR, 99% of the time) or to predict wireless device battery performance over the long duration. For example, on average, the current drain will be X milli-amps/hour to maintain an average transmit power level of Y.

---

Algorithm 1a

---

Step 1.
For l = 1 to N do
  If $\Sigma_{j \in C_l} \overline{\eta_j} \leq P_{max}^D$ then
    For all $j \in C_l$, set $p_{t,j}^D = \overline{\eta_j}$.
  else
Using the bisection method, find $p_{t,j}^D$ and $\mu^{(0)} > 0$ such that $\Sigma_{j \in C_l} p_{t,j}^D = P_{max}^D$ and $$p_{t,j}^D = \left[ \frac{1}{\mu^{(0)}} - \frac{\sigma^2 + I_j}{|h_j|^2} \right]_0^{\eta_j}$$

end if $$R_l = \sum_{j \in C_l} \log\left(1 + \frac{|h_j|^2 p_{t,j}^D}{\sigma^2 + I_j}\right).$$

end for

Step 2. Find the best cellular wireless device for the D2D wireless device pair to match, using $l^* = \mathrm{argmax}_l R_l$.

---

Figure 3:
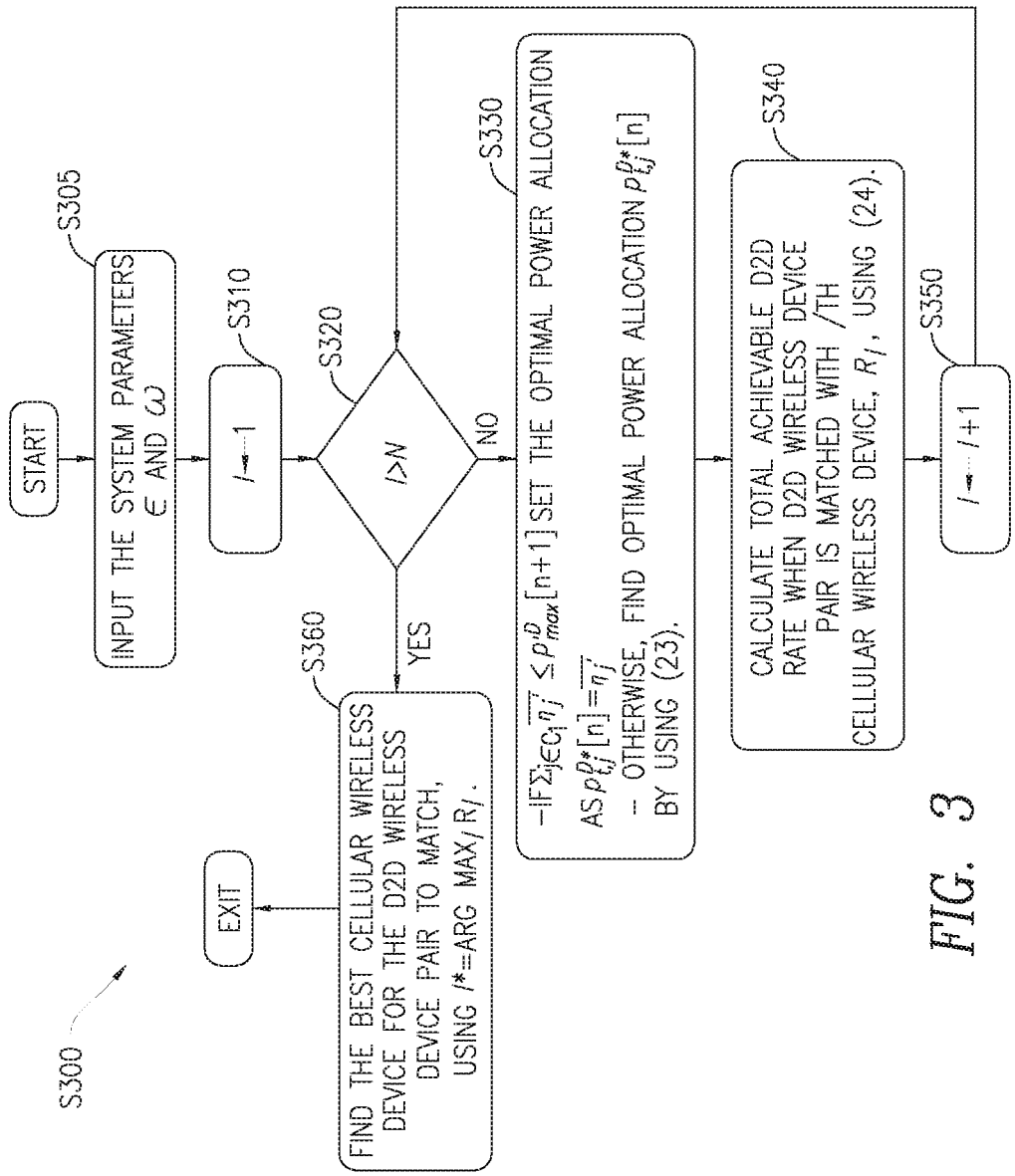
FIG. 3 is a flowchart illustrating an exemplary process for matching a D2D wireless device pair with an active cellular wireless device utilizing principles of the present disclosure.

FIG. 3 illustrates an exemplary process (step S300) performed by a network entity implementing Algorithm 1a, shown above. Initially, system parameters ∈ and ω are input into the system (step S305). A counter, l is initially set to 1 (step S310) and it is determined if l is greater than the number of cellular wireless devices N, at step S320. If l is not greater than N, then if $\Sigma_{j \in C_l} \overline{\eta_j} \leq P_{max}^D[n+1]$ then the optimal power allocation is set as $p_{t,j}^D = \overline{\eta_j}$. Otherwise, the optimal power allocation is found by using equation (23) below (step S330). The total achievable D2D rate is calculated when it is matched with the lth cellular wireless device, Rsub l, using equation (24) below (step S340). The counter l is incremented to l+1 (step S350), and the process reverts back to step S320. If, at step S120 it is determined that counter/is greater than N, then the best cellular wireless device for the D2D wireless device pair to match with is found using $l^* = \arg(\max_l R_l)$ (step S360).

In an alternate embodiment, Algorithm 1b may be implemented by the network entity. The input of Algorithm 1b below is average channel measurement, which may be used to find the best cellular match.

---

Algorithm 1b

---

Step 1.
For l = 1 to N do
For all $j \in C_l$, calculate
$\overline{\eta_j} \triangleq E\{\eta_j\}$.
$\overline{a_j} \triangleq E\{(\sigma^2 + I_j^0)(\sigma^2 + I_j)\}$, $\overline{b_j} \triangleq E\{(\sigma^2 + I_j^0)|h_j|^2\}$, $\overline{c_j} \triangleq E\{(\sigma^2 + I_j)I_j'\}$.

$$\overline{\kappa_j} \triangleq \frac{\overline{b_j}\overline{c_j}}{\overline{a_j}^2}, \overline{\beta_j} \triangleq \frac{\overline{b_j} + \overline{c_j}}{\overline{a_j}} \text{ and } \overline{\gamma_j} \triangleq \frac{\overline{b_j} - \overline{c_j}}{\overline{a_j}}.$$

Define $C_l' = \{j \in C_l | \overline{b_j} > \overline{c_j}\}$.
if $\Sigma_{j \in C_l} \overline{\eta_j} \leq P_{max}^D$ then
  For all $j \in C_l'$, set $p_{t,j}^D = \overline{\eta_j}$.
  For all $j \in C_l \setminus C_l'$, set $p_{t,j}^D = 0$.
else
Using the bisection method, find $p_{t,j}^D$ and $\lambda^{(0)} > 0$ such that $\Sigma_{j \in C_l} p_{t,j}^D = P_{max}^D$ and $$p_{t,j}^D = \left[ \frac{-\overline{\beta_j} + \sqrt{\overline{\beta_j}^2 - 4\overline{\kappa_j}\left(1 - \frac{\overline{\gamma_j}}{\lambda^{(0)}}\right)}}{2\overline{\kappa_j}} \right]_0^{\eta_j}.$$

end if $$\text{Calculate } R_l^{improv} = \sum_{j \in C_l} \log\left(\frac{\overline{a_j} + \overline{b_j}p_{t,j}^D}{\overline{a_j} + \overline{c_j}p_{t,j}^D}\right).$$

l ← l+1.
end for
Step 2. Find the best cellular wireless device for the D2D wireless device pair to match, using $l^* = \mathrm{argmax}_l R_l^{improv}$.

---

Pseudo Code for Implementing a D2D Ergodic Rate Maximization Algorithm (Algorithm for Finding a Solution for the Optimization Problem P3, as Identified in Equations 13-15 Below)

The power allocation for each RB is found such that the sum-rate is improved satisfying constraints on the sum-power of the D2D wireless device pair and also the SINR of the interfering cellular wireless devices in the main cell and neighboring cells. To implement the long-term sum-rate improvement method, the following steps are employed.

In this algorithm, it is assumed that the best cellular match from Algorithm 1b is known. The values of Lagrange multipliers are estimated using the subgradient method.

Using the full statistics of involved channels, the subgradient values are estimate using the subgradient method.

The power allocation for each RB is found such that the achievable sum-rate is improved, satisfying the constraints on the sum-power of the D2D wireless device pair and also the SINR of the interfering cellular wireless devices in the main cell and neighboring cells. In this step, the Lagrange multiplier values and the optimal subgradient values which have been obtained in the previous step are used.

The network entity implements Algorithms 2a and 2b satisfy long-term sum-power and per RB individual power constraints for D2D wireless device pairs in order to control battery-usage and assure a specific QoS level for other cellular wireless devices. Then network entity implements Algorithms 2a and 2b to perform convex optimization ("convexifying") of the formulation through, in one embodiment, the use of the Chernoff bound, to assure the existence of a unique solution and to make possible a solution based on methods such as the subgradient approach. In another embodiment, the network entity implements Algorithm 2a and 2b to perform convexifying of the formulation through first, high SINR approximation of the sum rate and, and second, the Chernoff bound to assure the existence of a unique solution and to make possible a solution based on known methods such as the subgradient approach.

Algorithm 2a below provides an optimal solution for the convex problem of optimization problem P2 (as identified in equations 9-11 below) below. P3 also provided below, is an approximation of the original optimization problem P1 (as identified in equations 1-4 below) below, after application of the Chernoff bound.

In Algorithm 2a below, T is the number of LTE frames over which a stationary channel environment for the D2D wireless device can be assumed.

---

Algorithm 2a:

Step1. Use Algorithm 1 to find l*.

Step2. Input $\epsilon$ and $\omega$. Initialize $\mu[0]$ and $\lambda_j[0]$ (for all $j \in C_{l^*}$). Set iteration number K, step sizes $s_\mu$ and $s_\lambda$.
For k = 1 to K do
1) Solve the following convex optimization problem and find $p_{t,j}^{D*}(\lambda_j[n], \mu[n])$ (for all $j \in C_{l^*}$):

$$p_{t,j}^{D*}(\lambda_j[k], \mu[k]) = \arg\max_{p_{t,j}^D \geq 0} \log\left(1 + \frac{|h_j|^2 p_{t,j}^D}{\sigma^2 + I_j}\right) - \mu[n]p_{t,j}^D -$$

$\lambda_j[k]e^{\omega(p_{t,j}^D - \eta_j)}$.

2) Calculate g[k] using equation (17).
3) Calculate $\partial\mu[k] = P_{max}^D - \Sigma_{j \in C_l} \mathbb{E}\{p_{t,j}^{D*}(\lambda_j[k], \mu[k])\}$.
4) Calculate $\partial\lambda_j[k] = \epsilon - \mathbb{E}\{(e^{\omega(p_{t,j}^{D*}(\lambda_j[k],\mu[k]) - \eta_j)}\}$ (for all $j \in C_{l^*}$).
5) Set $\mu[k+1] = (\mu[k] - s_\mu \partial\mu[k])_+$ and $\lambda_j[k+1] = (\lambda_j[k] - s_\lambda \partial\lambda_j[k])_+$ (for all $j \in C_{l^*}$).
end for
Step3. Calculate k' = arg min g[k]. Set $\lambda_j^* = \lambda_j[k']$ (for all $j \in C_{l^*}$) and $\mu^* = \mu[k']$.
  For n = 1 to T do
  1) Solve the following convex optimization problem and find the optimal power allocation
    (for all $j \in C_{l^*}$):

$$p_{t,j}^{D*}[n] = \arg\max_{p_{t,j}^D \geq 0} \log\left(1 + \frac{|h_j|^2 p_{t,j}^D}{\sigma^2 + I_j}\right) - \mu^* p_{t,j}^D - \lambda_j^* e^{\omega(p_{t,j}^D - \eta_j)}.$$

end for

---

Figure 4:
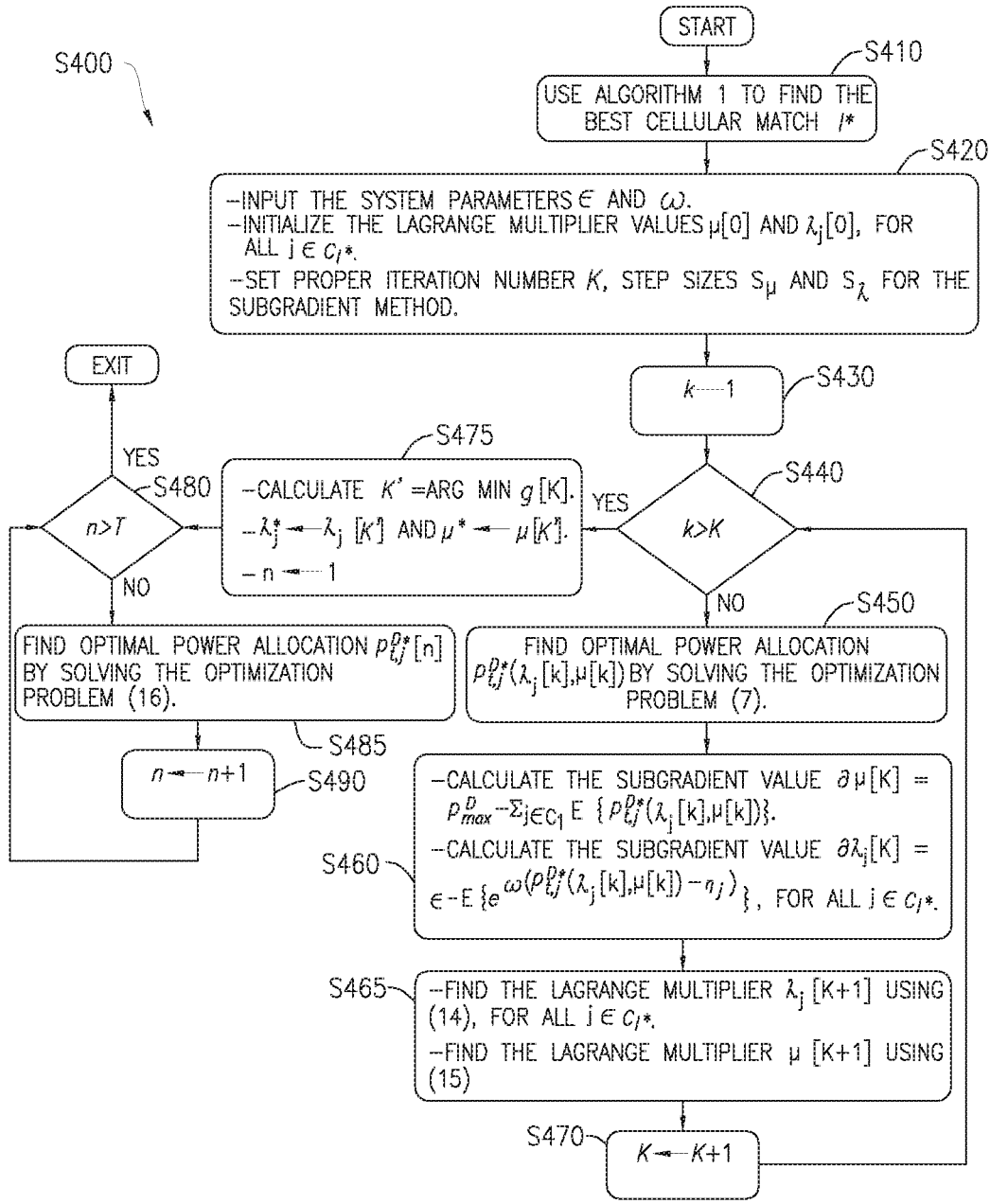
FIG. 4 is a flowchart illustrating an exemplary process for determining optimal power allocation for each resource block utilizing principles of the present disclosure.

FIG. 4 illustrates an exemplary process (S400) performed by the network entity implementing by Algorithm 2a, shown above. The best cellular match is found using Algorithm 1, described above (step S410). System parameters $\epsilon$ and $\omega$ are input. Lagrange multiplier values $\mu[0]$ and $\lambda_j[0]$ for all $j \in C_{l^*}$ are initialized, and the proper iteration number K, and step sizes $s_\mu$ and $s_\lambda$ are set for the subgradient method (step S420). Beginning with counter k set to 1 (step S430), it is determined if counter k is greater than K (S440). If counter k is not greater than K, optimal power allocation $p_{t,j}^{D*}(\lambda_j[k], \mu[k])$ is solved using equation 7 (below) (step S450) and the subgradient value $\partial\lambda_j[k] = \epsilon - \mathbb{E}\{e^{\omega(p_{t,j}^{D*}(\lambda_j[k],\mu[k]) - \eta_j)}\}$, is calculated for all $j \in C_{l^*}$ (step S460). The Lagrange multiplier $\lambda_j[k+1]$ is found using equation (14) below, for all $j \in C_{l^*}$ and the Lagrange multiplier $\mu[k+1]$ is found using equation (15) below (step S465).

Counter k is incremented to k+1 (step 470) and step S440 is repeated. If it is determined at step S440 that k is greater than K, then k'=arg min g[k] is calculated where $\lambda_j^* \leftarrow \lambda_j[k']$ and $\mu^* \leftarrow \mu[k']$ and n $\leftarrow$ 1 (step S475). If it is determined that n>T (step S480) the process ends. However, if it is determined that n is not greater than T, then optimal power allocation $p_{t,j}^{D*}[n]$ is found by solving the optimization equation (16) below (step S485), counter n is increased to n+1 (step S490) and the process reverts to step S480.

Alternately, Algorithm 2b may be used.

---

Algorithm 2b

Step1. Use Algorithm 1 to find l*.

Step2. Input $\epsilon$ and initialize $\omega_j$ and $\lambda_j[0]$, for all $j \in C_{l^*}$, and $\mu[0]$. Set a proper iteration number R (R = 1 for fixed $\omega_j$) and K and proper step sizes $s_\mu$ and $s_\lambda$. Define $a_j \stackrel{\Delta}{=} (\sigma^2 + I_j^0)(\sigma^2 + I_j)$, $b_j \stackrel{\Delta}{=} (\sigma^2 + I_j^0)|h_j|^2$, $c_j \stackrel{\Delta}{=} (\sigma^2 + I_j)I_j'$. Set $g^{best} = +\infty$.
  for r = 1 to R do
    for k = 1 to K do
    1) Solve the convex optimization problem in (37) and find $p_{t,j}^{D*}(\lambda_j[k], \mu[k])$,
      $j \in C_{l^*}$.
    2) Calculate g[k] using (38).
    3) If $g^{best}$ > g[k], set $g^{best}$ = g[k], $\mu^{best}$ = $\mu[k]$ and $\lambda_j^{best}$ = $\lambda_j[k]$, for all $j \in C_{l^*}$.
    4) Calculate $\partial\mu[k] = P_{max}^D - \Sigma_{j \in C_l}\mathbb{E}\{p_{t,j}^{D*}(\lambda_j[k], \mu[k])\}$.

5) Calculate $\partial\lambda_j[k] = \epsilon - \mathbb{E}\{e^{\omega_j(p_{t,j}^D(\lambda_j[k],\mu[k])-\eta_j)}\}$, for all $j \in C_{l^*}$.

6) Set $\mu[k+1] = (\mu[k] - s_\mu\partial\mu[k])_+$ and $\lambda_j[k+1] = (\lambda_j[k] - s_\lambda\partial\lambda_j[k])_+$,
      $j \in C_{l^*}$.
    7) 7) k $\leftarrow$ k + 1.
    end for
    a) Set $\lambda_j^* = \partial_j^{best}$, for all $j \in C_{l^*}$, and $\mu^* = \mu^{best}$.
    b) Estimate mean, $m_j$, and variance, $v_j^2$, of the random variable
    $p_{t,j}^{D*}(\lambda_j^*, \mu^*) - \eta_j$,
    $j \in C_{l^*}$.

c) Update the value of $\omega_j$, for all $j \in C_{l^*}$, as $\omega_j = -\frac{m_j}{v_j^2}$. d) r $\leftarrow$ r + 1.

end for
  Step3.
  for n = 1 to T do
  1) Solve the convex optimization problem in (39) and find the optimal power allocation, for all $j \in C_{l^*}$.
  2) n $\leftarrow$ n + 1.
  end for

---

Pseudo Code for Implementing Ergodic Sum-Rate Improvement Algorithm (a Heuristic Sub-Optimal Solution for the Optimization Problem P3)

To implement the heuristic long-term D2D rate improvement method the following steps may be employed:

In this algorithm, it is assumed that the best cellular match from Algorithms 1a and 1b is known.

In one embodiment, the Lagrange multipliers are calculated using the subgradient method. Time-averaging is used as an approximation for statistical mean to approximate the subgradient values.

Using the history of consumed powers over each RB, the constraints in each fading state is updated such that the long-term constraints to be satisfied.

The optimal power allocation for each RB is found such that the achievable sum-rate is improved, satisfying the constraints on the sum-power of the D2D wireless device pair and also the SINR of the interfering cellular devices in the main cell and neighboring cells. In this step, the subgradient values which have been obtained in the previous step are used.

In addition to the features of Algorithms 2a and 2b, the network entity implements Algorithm 3a to approximate the long-term constraints through the use of time-averaging instead of statistical mean. Algorithm 3a is a sub-optimal algorithm, but the computational complexity is less than Algorithm 2a.

In addition to the features of Algorithm 2b, the network entity implements Algorithm 3b to approximate the value of subgradients through the use of time-averaging instead of statistical mean. Algorithm 3b is a sub-optimal algorithm, but the computational complexity is less than the optimal algorithm, i.e., Algorithm 2b.

In Algorithm 3a, T is the number of LTE frames over which a stationary environment for the D2D wireless device can be assumed.

---
Algorithm 3a
---

Step1. Use Algorithm 1a to find l*.
Step2. Input $\epsilon$ and $\omega$.
For n = 1 to T do
  1) Calculate $P_{max}'^D[n] = nP_{max}^D - (n-1)\mathbb{E}_{n-1}\{\Sigma_{j \in C_{l^*}} p_{t,j}^D\}$.

2) Calculate $\eta_j'[n] = \eta_j[n] + \frac{1}{\omega}\log\left(n\epsilon - (n-1)\mathbb{E}_{n-1}\left\{e^{\omega(p_{t,j}^D - \eta_j)}\right\}\right)$ (for all $j \in C_{l^*}$).
  3) If $\Sigma_{l \in c_r} \eta_j'[n] \leq P_{max}'^D[n]$ then
    For all $j \in C_{l^*}$, set $p_{t,j}^{D*}[n] = \eta_j'[n]$.
  else
    Using the bisection method, find $p_{t,j}^{D*}[n]$ and $\mu[n]0 > 0$ such that $\Sigma_{j \in C_{l^*}} p_{t,j}^D = P_{max}^D$
  and $$p_{t,j}^{D*}[n] = \left[\frac{1}{\mu[n]} - \frac{\sigma^2 + I_j}{|h_j|^2}\right]_0^{\eta_j'[n]}.$$

end if
end for

---

Figure 5:
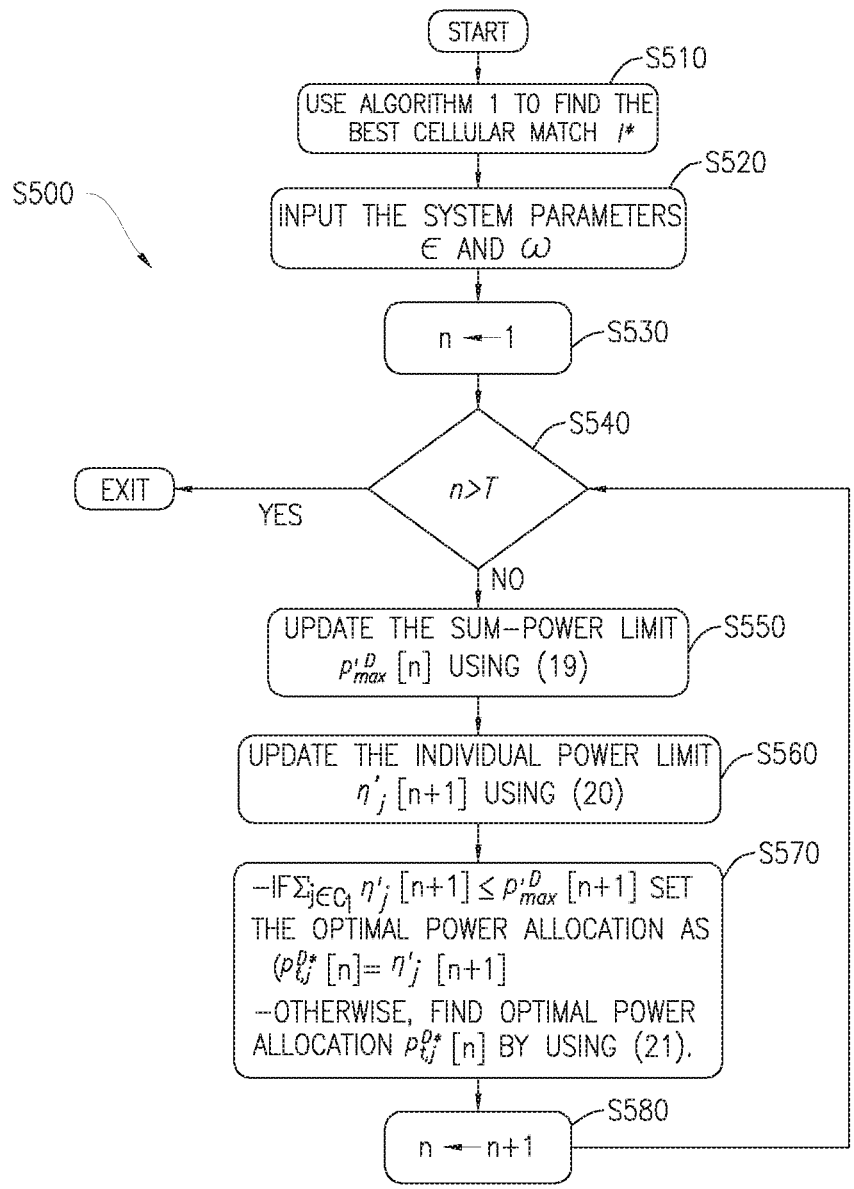
FIG. 5 is a flowchart illustrating an exemplary process for implementing a heuristic long-term D2D rate improvement method using low-complexity dynamic time-averaging.

FIG. 5 illustrates an exemplary process (S500) performed by the network entity implementing Algorithm 3a, above. Initially, Algorithm 1a above is implemented by the network entity to find the best cellular match l* (step S510). System parameters $\epsilon$ and $\omega$ are input (step S520). A counter n, is initialized to 1 (step S530) and it is determined if n is greater than T (step S540). If n is not greater than T, the sum-power limit $P'_{max}^D[n]$ is updated using equation (19) below (step S550). The individual power limit $\eta'_j[n+1]$ is updated using equation (20) below (step S560). If $\Sigma_{j \in C_{l^*}} \eta'_j[n+1] \leq P'_{max}^D[n+1]$, the optimal power allocation is set as $p_{t,j}^{D*}[n] = \eta'_j[n+1]$. Otherwise, the optimal power allocation $p_{t,j}^{D*}[n]$ is found by using equation (21) below (step S570). The counter n is incremented (step S580) and the process starting with step S540 repeated.

Alternately, algorithm 3b may be used. In Algorithm 3b, T is the number of LTE frames over which we it can be assumed that there is a stationary environment for D2D wireless device.

---
Algorithm 3b
---

Step1. Use Algorithm 1a to find l*.
Step2. Input $\epsilon$ and $\omega_j$. Initialize $\mu[0]$ and $\lambda_j[0]$, for all $j \in C_{l^*}$. Set proper step sizes $s_\mu$ and $s_\lambda$.

Define $a_j \triangleq (\sigma^2 + I_j^0)(\sigma^2 + I_j)$, $b_j \triangleq (\sigma^2 + I_j^0)|h_j|^2$, $c_j \triangleq (\sigma^2 + I_j)I_j'$.
for n = 1 to T do
  1) Solve the following convex optimization problem in (58) and find $p_{t,j}^{D*}[n]$, for all $j \in C_{l^*}$.
  2) Calculate $\partial \mu[n] = P_{max}^D - \Sigma_{j \in C_l} \mathbb{E}_n\{p_{t,j}^{D*}\}$.

3) Calculate $\partial \lambda_j[n] = \epsilon - \mathbb{E}_n\left\{e^{\omega_j(p_{t,j}^{D*} - \eta_j)}\right\}$, for all $j \in C_{l^*}$.

4) Set $\mu[n+1] = (\mu[n] - s_\mu \partial \mu[n])_+$ and $\lambda_j[n+1] = (\lambda_j[n] - s_\lambda \partial \lambda_j[n])_+$, for all $j \in C_{l^*}$
  5) 5) n ← n+1.
end for

---

Pseudo Code for Implementing Ergodic Sum-Rate Maximization Algorithm (A Heuristic Sub-Optimal Solution for the Optimization Problem P3 Using One-Bit Feedback Information)

To implement long-term sum-rate improvement method, the following steps are employed:

In this algorithm, it is assumed that the best cellular match from Algorithm 1 is known.

The Lagrange multipliers are calculated using the subgradient method. Time-averaging is used as an approximation for statistical mean to approximate the subgradient values. Furthermore, feedback information is used from the interfering cellular device to determine the sign of the subgradient which is related to SINR constraints for the interfering cellular devices.

The optimal power allocation for each RB is found such that the achievable sum-rate is improved satisfying the constraints on the sum-power of the D2D wireless device pair and also the SINR of the interfering cellular wireless devices in the main cell and neighboring cells. In this step, using the obtained values in the previous step, the subgradients are updated.

The details of the proposed algorithm are given in Algorithm 4.

In addition to the features of Algorithm 2b and Algorithm 3b, the network entity implements Algorithm 4 to approximate the value of subgradients through the use of time-averaging instead of statistical mean. Algorithm 4 is a sub-optimal algorithm, but the computational complexity is less than the optimal algorithm, i.e., Algorithm 2b and also the amount of needed feedback for it is less than Algorithm 3b.

In Algorithm 4, T is the number of LTE frames over which a stationary environment for D2D wireless device pairs is assumed.

---
Algorithm 4
---

Step 1. Use Algorithm 1b to find l*.
Step 2. Input $\epsilon$ and $\omega_j$. Initialize $\mu[0]$ and $\lambda_j[0]$, for all $j \in C_{l^*}$. Set step sizes $s_\mu$ and $s_\lambda$. Define $a_j \triangleq (\sigma^2 + I_j^0)(\sigma^2 + I_j)$, $b_j \triangleq (\sigma^2 + I_j^0)|h_j|^2$, $c_j \triangleq (\sigma^2 + I_j)I_j'$.
for n = 1 to T do

Algorithm 4

1) Solve the following convex optimization problem in (58) and find $p_{t,j}^{D*}[n]$, for all $j \in C_l^*$ 2

2) Calculate $\partial\mu[n] = P_{max}^D - \sum_{j \in C_l} E_n\{p_{t,j}^{D*}\}$.

3) Calculate sign($\partial\lambda_j[n]$), for all $j \in C_l^*$, based on received feedback information from the interfering cellular wireless devices. Considering the fact that $p_{t,j}^{D*}[n]$ is a decreasing function of $\lambda_j[n]$, sign($\partial\lambda_j[n]$) is determined such that there is only an increase in the power over the corresponding RB when the SINR constraint is satisfied for all of the interfering cellular wireless devices.

4) Set $\mu[n+1] = (\mu[n] - s_\mu \partial\mu[n])_+$ and $\lambda_j[n+1] = (\lambda_j[n] - s_\lambda \text{sign}(\partial\lambda_j[n]))_+$, for all $j \in C_l^*$.

5) $n \leftarrow n + 1$.
end for

Pseudo Code for Implementing Optimal Ergodic Sum-Rate Maximization Algorithm
(Algorithm for Finding the Optimal Solution for the Optimization Problem in P5)

To implement long-term sum-rate improvement method, the following steps are employed:

In this algorithm, it is assumed that the best cellular match from Algorithm 1 is known.

The values of Lagrange multipliers are estimated using the subgradient method.

The power allocation for each RB is found such that the achievable sum-rate is improved satisfying the constraints on the sum-power of the D2D wireless device pair and also the SINR of the interfering cellular devices in the main cell and neighboring cells. In this step, the Lagrange multiplier values which have been obtained in the previous step are used.

The details of the proposed algorithm are given in Algorithm 5.

The features of Algorithm 5 are similar to Algorithm 2b.

In Algorithm 5, T is the number of LTE frames over which a stationary environment for D2D wireless device pairs can be assumed.

Algorithm 5

Step 1. Use Algorithm 1 to find $l^*$.
Step 2. Input $\varepsilon$ and initialize $\omega_j$ and $\lambda_j[0]$, for all $j \in C_l^*$, and $\mu[0]$. Set a proper iteration number R (R = 1 for fixed $\omega_j$) and K and proper step sizes $s_\mu$ and $s_\lambda$.
Define $a_j \triangleq (\sigma^2 + I_j^0)(\sigma^2 + I_j)$, $b_j \triangleq (\sigma^2 + I_j^0)|h_j|^2$, $c_j \triangleq (\sigma^2 + I_j)I_j'$. Set $g^{best} = +\infty$.
for r = 1 to R do
  for k = 1 to K do
    1) Solve the convex optimization problem in (92) and find $p_{t,j}^{D*}(\lambda_j[k], \mu[k])$, $j \in C_l^*$.
    2) Calculate g[k] using (38).
    3) If $g^{best} > g[k]$, set $g^{best} = g[k]$, $\mu^{best} = \mu[k]$ and $\lambda_j^{best} = \lambda_j[k]$, for all $j \in C_l^*$.
    4) Calculate $\partial\mu[k] = P_{max}^D - \sum_{j \in C_l} E\{p_{t,j}^{D*}(\lambda_j[k], \mu[k])\}$.
    5) Calculate $\partial\lambda_j[k] = \varepsilon - E\{e^{\omega_j(p_{t,j}^{D*}(\lambda_j[k],\mu[k])-\eta_j)}\}$, for all $j \in C_l^*$.
    6) Set $\mu[k + 1] = (\mu[k] - s_\mu \partial\mu[k])_+$ and $\lambda_j[k + 1] = (\lambda_j[k] - s_\lambda \partial\lambda_j[k])_+$, $j \in C_l^*$.
    7) $k \leftarrow k + 1$.
  end for
  a) Set $\lambda_j^* = \lambda_j^{best}$, for all $j \in C_l^*$, and $\mu^* = \mu^{best}$.
  b) Estimate mean, $m_j$, and variance, $v_j^2$, of the random variable

Algorithm 5 (continued)

$p_{t,j}^{D*}(\lambda_j^*, \mu^*) - \eta_j$, $j \in C_l^*$.

c) Update the value of $\omega_j$, for all $j \in C_l^*$, as $\omega_j = -\frac{m_j}{v_j^2} \cdot d$, $r \leftarrow r + 1$.
end for
Step 3.
for n = 1 to T do
  1) Solve the convex optimization problem in (39) and find the optimal power allocation, for all $j \in C_l^*$.
  2) $n \leftarrow n + 1$.
end for Detailed Formulation and Solution
Ergodic Sum-Rate Maximization In this section, it is assumed that the lth cellular wireless device is the solution for the problem of finding the best cellular match. The resource allocation problem for finding the optimal resource allocation for the new D2D wireless device pair, in order to improve the sum rate, is as follows:

$$P1: \max_{\{p_{t,j}^D \geq 0\}} E\left\{\sum_{j \in C_l}\left[\log\left(1 + \frac{p_{r,j}^C}{\sigma^2 + I_j^0 + p_{t,j}^D I_j'}\right) + \log\left(1 + \frac{|h_j|^2 p_{t,j}^D}{\sigma^2 + I_j}\right)\right]\right\} \quad (1)$$

or, alternatively as, $$P1: \max_{\{p_{t,j}^D \geq 0\}} E\left\{\sum_{j \in C_l} \log\left(1 + \frac{|h_j|^2 p_{t,j}^D}{\sigma^2 + I_j}\right)\right\} \quad (1.1)$$

$$\text{subject to } E\left\{\sum_{j \in C_l} p_{t,j}^D\right\} \leq P_{max}^D \quad (2)$$

$$Pr\left\{\frac{p_{r,j}^C}{\sigma^2 + I_j^0 + p_{t,j}^D I_j'} \leq \zeta_{j,min}^{intra}\right\} \leq \varepsilon, j \in C_l, i = 1, 2, \ldots, N \quad (3)$$

$$Pr\left\{\frac{p_{r,j}^{(k)}}{\sigma^2 + I_j^{0,(k)} + p_{t,j}^D I_j'^{(k)}} \leq \zeta_{j,min}^{(k)}\right\} \leq \varepsilon, j \in C_l, k \in S_j, \quad (4)$$
$i = 1, 2, \ldots, N$.

where $p_{t,j}^D$ is the D2D transmitted power, $p_{r,j}^C$ is the received power of the ith cellular wireless device, $p_{r,j}^{(k)}$ is the received power of the kth wireless device over the jth RB where $j \in C_l$ and $k \in S_j$, $h_j$ is the D2D channel coefficient over the $j^{th}$ RB (for the new D2D wireless device), $I_j$ is the received interference power from all interfering wireless devices to the new D2D wireless device, and $\sigma^2$ is noise power, which is assumed is the same over all RB's. In the above, $I_j'$ and $I_j'^{(k)}$ are defined such that $p_{t,j}^D I_j'$ and $p_{t,j}^D I_j'^{(k)}$ are the received interference power from the new D2D wireless device for the cellular wireless device which uses the $j^{th}$ RB and for the $k^{th}$ neighboring cellular wireless device ($k \in S_j$), respectively. Furthermore, $I_j^0$ and $I_j^{0,(k)}$ are the interference power the cellular wireless device which uses the $j^{th}$ RB and the kth neighboring cellular wireless device ($k \in S_j$) receive before admitting the new D2D wireless device, respectively.

It should be noted that Equation 1 above maximizes the sum rate of the D2D wireless device and cellular wireless device and thus has two log terms in the P1 formulation. The embodiment of Equation 1.1 above only maximizes the D2D wireless device rate and thus only has a single log term as in the P1a formulation.

The long-term constraint on the sum-power, i.e. (2), may be viewed as a constraint on the battery usage of the D2D wireless device.

The constraints in (3) and (4) ensure that the probability that the SINR is below a target threshold is less than a pre-defined small value, thus assuring a specific long-term QoS for the cellular wireless devices in the main cell and also neighboring cells that use the same RBs as the D2D wireless device pair. Using Markov's inequality:

$$Pr\{SINR_j \geq \zeta_{j,min}^{intra}\} \leq \frac{E\{SINR_j\}}{\zeta_{j,min}^{intra}} \quad (5)$$

On the other hand, from the SINR constraint in (3) then $Pr\{SINR_j \geq \zeta_{j,min}^{intra}\} \geq 1-\varepsilon$. Then, it can be concluded that $E\{SINR_j\} \geq (1-\varepsilon)\zeta_{j,min}^{intra}$. Using the same method it can be shown that $E\{SINR_j^{(k)}\} \geq (1-\varepsilon)\zeta_{j,min}^{(k)}$.

Furthermore, the constraints in (3) and (4) can be simplified to $Pr\{p_{t,j}^D \geq \eta_j\} < \varepsilon$ where $$\eta_j \triangleq \min\left\{\frac{p_{r,j}^C / \zeta_{j,min}^{intra} - (\sigma^2 + I_j^0)^A}{I_j'},\right.$$

$$\left.\left\{\frac{p_{r,j}^{(k)} / \zeta_{j,min}^{(k)} - (\sigma^2 + I_j^{0,(k)})^A}{I_{j_A}^{\prime(k)}}\right\}_{k \in S_j}\right\}$$

equivalent to $$\max_{\{p_{t,j}^D \geq 0\}} E\left\{\sum_{j \in C_l}\left[\log\left(1 + \frac{p_{r,j}^C}{\sigma^2 + I_j^0 + p_{t,j}^D I_j'}\right) - \right.\right. \quad (6)$$

$$\left.\left.\sum_{j \in C_l} \log\left(1 + \frac{p_{r,j}^C}{\sigma^2 + I_j^0}\right) + \log\left(1 + \frac{|h_j|^2 p_{t,j}^D}{\sigma^2 + I_j}\right)\right]\right\}$$

or, alternatively, for P2a $$\max_{\{p_{t,j}^D \geq 0\}} \mathbb{E}\left\{\sum_{j \in C_l} \log\left(1 + \frac{|h_j|^2 p_{t,j}^D}{\sigma^2 + I_j}\right)\right\} \quad (6.1)$$

subject to $E\left\{\sum_{j \in C_l} p_{t,j}^D\right\} \leq P_{max}^D \quad (7)$ $Pr\{p_{t,j}^D \geq \eta_j\} \leq \varepsilon, j \in C_l. \quad (8)$ It should be noted that Equation 6 above maximizes the sum rate of the D2D wireless device and cellular wireless device and thus has multiple log terms in the P1 formulation, whereas the embodiment of Equation 6.1 above only maximizes the D2D wireless device rate and thus only has a single log term as in the P1a formulation.

For sufficiently small values of $\varepsilon$ and large values of $\zeta_{j,min}^{intra}$ (such that $\zeta_{j,min}^{intra} \gg 1$), (6) can be approximated as follows:

$$P2: \max_{\{p_{t,j}^D \geq 0\}} E\left\{\sum_{j \in C_l} \log\left(\frac{a_j + b_j p_{t,j}^D}{a_j + c_j p_{t,j}^D}\right)\right\} \quad (9)$$

subject to $E\left\{\sum_{j \in C_l} p_{t,j}^D\right\} \leq P_{max}^D \quad (10)$ $Pr\{p_{t,j}^D \geq \eta_j\} \leq \varepsilon, j \in C_l. \quad (11)$ where $a_j \triangleq (\sigma^2 + I_j^0)(\sigma^2 + I_j)$, $b_j \triangleq (\sigma^2 + I_j^0)|h_j|^2$, $c_j \triangleq (\sigma^2 + I_j)I_j'$. The last constraint in (11) is not a convex constraint. Using the Chernoff bound, $$Pr\{p_{t,j}^D \geq \eta_j\} \leq E\{e^{\omega_j(p_{t,j}^D - \eta_j)}\}. \quad (12)$$

The inequality is valid for any $\omega_j > 0$. By adjusting the value of $\omega_j$, the inequality can be tight. If we have $$E\{e^{\omega(p_{t,j}^D - \eta_j)}\} \leq \varepsilon$$

then the constraint in (11) will be assured. Thus, the following optimization problem can be proposed:

$$P3: \max_{\{p_{t,j}^D \geq 0\}} E\left\{\sum_{j \in C_l} \log\left(\frac{a_j + b_j p_{t,j}^D}{a_j + c_j p_{t,j}^D}\right)\right\} \quad (13)$$

$$P3: \max_{\{p_{t,j}^D \geq 0\}} \mathbb{E}\left\{\sum_{j \in C_l} \log\left(1 + \frac{|h_j|^2 p_{t,j}^D}{\sigma^2 + I_j}\right)\right\} \quad (13.1)$$

subject to $E\left\{\sum_{j \in C_l} p_{t,j}^D\right\} \leq P_{max}^D \quad (14)$ or, alternatively, for P3a subject to $\mathbb{E}\{\sum_{j \in C_l} p_{t,j}^D\} \leq P_{max}^D \quad (14.1)$ $E\{e^{\omega_j(p_{t,j}^D - \eta_j)}\} \leq \varepsilon, j \in C_l. \quad (15)$ $\mathbb{E}\{e^{\omega(p_{t,j}^D - \eta_j)}\} \leq \epsilon, j \in C_l \quad (15.1)$ It should be noted that Equations 13, 14 and 15 relate to maximizing the sum rate of the D2D wireless device and cellular wireless device in the P3 formulation, whereas the embodiment of Equations 13.1, 14.1, and 15.1 above only maximize the D2D wireless device rate, in the P3a formulation.

The objective function of (13), for $\{p_{t,j}^D \geq 0\}$, can be upper-bounded as follows:

$$E\left\{\sum_{j \in C_l} \log\left(\frac{a_j + b_j p_{t,j}^D}{a_j + c_j p_{t,j}^D}\right)\right\} = \quad (16)$$

$$\sum_{j \in C_l} Pr\{b_j \geq c_j\} E\left\{\log\left(\frac{a_j + b_j p_{t,j}^D}{a_j + c_j p_{t,j}^D}\right) \middle| b_j \geq c_j\right\} +$$

$$Pr\{b_j < c_j\} E\left\{\log\left(\frac{a_j + b_j p_{t,j}^D}{a_j + c_j p_{t,j}^D}\right) \middle| b_j < c_j\right\} \leq$$

-continued $$\sum_{j \in C_l} Pr\{b_j \geq c_j\} E\left\{\log\left(\frac{a_j + b_j p_{t,j}^D}{a_j + c_j p_{t,j}^D}\right) \bigg| b_j \geq c_j\right\}.$$

The inequality comes from the fact that the function $$\log\left(\frac{a_j + b_j p_{t,j}^D}{a_j + c_j p_{t,j}^D}\right),$$

for $b_j < c_j$ and $p_{t,j}^D \geq 0$, is a decreasing (and convex) function. The upper-bound is achievable if and only if for $b_j < c_j$, $p_{t,j}^D = 0$. In other words, $P_{t,j}^D = 0$ is the optimal solution when $b_j < c_j$ if and only the constraint in (14) is satisfied. The sum-power constraint is satisfied if:

$$E\left\{\sum_{j \in C_l} p_{t,j}^D\right\} = \qquad (17)$$

$$\sum_{j \in C_l} (Pr\{b_j \geq c_j\} E\{p_{t,j}^D | b_j \geq c_j\} + Pr\{b_j < c_j\} E\{p_{t,j}^D | b_j < c_j\}) =$$

$$\sum_{j \in C_l} Pr\{b_j \geq c_j\} E\{p_{t,j}^D | b_j \geq c_j\} \leq P_{max}^D.$$

The individual power constraints are satisfied if:

$$E\{e^{\omega_j(p_{t,j}^D - \eta_j)}\} = Pr\{b_j \geq c_j\} E\{e^{\omega_j(p_{t,j}^D - \eta_j)} | b_j \geq c_j\} + \qquad (18)$$

$$Pr\{b_j < c_j\} E\{e^{\omega_j(p_{t,j}^D - \eta_j)} | b_j < c_j\} =$$

$$Pr\{b_j \geq c_j\} E\{e^{\omega_j(p_{t,j}^D - \eta_j)} | b_j \geq c_j\} +$$

$$Pr\{b_j < c_j\} E\{e^{-\omega_j \eta_j} | b_j < c_j\} \leq \varepsilon.$$

Thus, (13) is equivalent to the following optimization problem:

$$\max_{\{p_{t,j}^D \geq 0\}} \sum_{j \in C_l} P_j E\left\{\log\left(\frac{a_j + b_j p_{t,j}^D}{a_j + c_j p_{t,j}^D}\right) \bigg| b_j \geq c_j\right\} \qquad (19)$$

$$\text{subject to } \sum_{j \in C_l} P_j E\{p_{t,j}^D | b_j \geq c_j\} \leq P_{max}^D \qquad (20)$$

$$P_j E\{e^{\omega_j(p_{t,j}^D - \eta_j)} | b_j \geq c_j\} \leq \varepsilon'_j \quad j \in C_l, \qquad (21)$$

where $P_j \triangleq Pr\{b_j \geq c_j\}$ is defined for all $j \in C_l$ and $\varepsilon'_j \triangleq \varepsilon - (1 - P_j) E\{e^{-\omega_j \eta_j}\}$.

Note that the function $$\log\left(\frac{a_j + b_j p_{t,j}^D}{a_j + c_j p_{t,j}^D}\right),$$

for $b_j \geq c_j$ and $p_{t,j}^D \geq 0$, is a concave (and increasing) function, thus the Lagrange method can be used to solve (19).

It can be shown that any solution for (19) is feasible by applying $P_{t,j}^D = 0$ when $b_j < c_j$, for the problem (13). Also, again by applying $p_{t,j}^D = 0$ when $b_j < c_j$, the objective function of the two problems are the same. Thus, the two problems (13) and (19) are equivalent. The Lagrange function of (19) can be written as $$L(\{p_{t,j}^D\}, \{\lambda_j\}, \mu) \triangleq \sum_{j \in C_l} P_j E\left\{\log\left(\frac{a_j + b_j p_{t,j}^D}{a_j + c_j p_{t,j}^D}\right) \bigg| b_j \geq c_j\right\} +$$

$$\mu\left(P_{max}^D - \sum_{j \in C_l} P_j E\{p_{t,j}^D | b_j \geq c_j\}\right) +$$

$$\sum_{j \in C_l} \lambda_j (\varepsilon' - P_j E\{e^{\omega_j(p_{t,j}^D - \eta_j)} | b_j \geq c_j\}) =$$

$$\sum_{j \in C_l} P_j E\left\{\log\left(\frac{a_j + b_j p_{t,j}^D}{a_j + c_j p_{t,j}^D}\right) - \mu p_{t,j}^D - \lambda_j e^{\omega_j(p_{t,j}^D - \eta_j)} \bigg| b_j \geq c_j\right\} +$$

$$\mu P_{max}^D + \sum_{j \in C_l} \lambda_j \varepsilon'_j.$$

By knowing that for $b_j < c_j$ we have $p_{t,j}^D = 0$, the Lagrange function also can be written as follows:

$$L(\{p_{t,j}^D\}, \{\lambda_j\}, \mu) = \qquad (22)$$

$$\sum_{j \in C_l} E\left\{\log\left(\frac{a_j + b_j p_{t,j}^D}{a_j + c_j p_{t,j}^D}\right) - \mu p_{t,j}^D - \lambda_j e^{\omega_j(p_{t,j}^D - \eta_j)}\right\} + \mu P_{max}^D + \sum_{j \in C_l} \lambda_j \varepsilon.$$

In an alternate embodiment, the inequality is valid for any $\omega > 0$. If $\mathbb{E}\{e^{\omega(p_{t,j}^D - \eta_j)}\} \leq \varepsilon$ then the constraint (Equation 11) will be assured. Thus, the following optimization problem can be proposed:

$$P3: \max_{\{p_{t,j}^D\} \geq 0} \mathbb{E}\left\{\sum_{j \in C_l} \log\left(1 + \frac{|h_j|^2 p_{t,j}^D}{\sigma^2 + I_j}\right)\right\} \qquad (22a)$$

$$\text{subject to } \mathbb{E}\left\{\sum_{j \in C_l} p_{t,j}^D\right\} \leq P_{max}^D \qquad (22b)$$

$$\mathbb{E}\{e^{\omega(p_{t,j}^D - \eta_j)}\} \leq \varepsilon, \quad j \in C_l. \qquad (22c)$$

The optimization problem in (a) through (c) is a convex optimization problem. The Lagrange multiplier function of (a) through (c) can be written as $$\mathcal{L}(\{p_{t,j}^D\}, \{\lambda_j\}, \mu) \triangleq \sum_{j \in C_l} \mathbb{E}\left\{\log\left(1 + \frac{|h_j|^2 p_{t,j}^D}{\sigma^2 + I_j}\right)\right\} +$$

$$\mu\left(P_{max}^D - \sum_{j \in C_l} \mathbb{E}\{p_{t,j}^D\}\right) + \sum_{j \in C_l} \lambda_j (\varepsilon - \mathbb{E}\{e^{\omega(p_{t,j}^D - \eta_j)}\}) =$$

$$\sum_{j \in C_l} \mathbb{E}\left\{\log\left(1 + \frac{|h_j|^2 p_{t,j}^D}{\sigma^2 + I_j}\right) - \mu p_{t,j}^D - \lambda_j e^{\omega(p_{t,j}^D - \eta_j)}\right\} + \mu P_{max}^D + \sum_{j \in C_l} \lambda_j \varepsilon.$$

The Lagrange dual function can be defined as"

$$g(\{\lambda_j\}, \mu) = \max_{\{p_{t,j}^D \geq 0\}} L(\{p_{t,j}^D\}, \{\lambda_j\}, \mu). \quad (23)$$

To find optimal $P_{t,j}^D$, for fixed values of $\lambda_j$ and $\mu$ and for $j \in C_l$, in (23), the following optimization problem needs to be solved for each j:

$$p_{t,j}^{D*}(\lambda_j, \mu) = \arg\max_{p_{t,j}^D \geq 0} \log\left(\frac{a_j + b_j p_{t,j}^D}{a_j + c_j p_{t,j}^D}\right) - \mu p_{t,j}^D - \lambda_j e^{\omega_j(p_{t,j}^D - \eta_j)}. \quad (24)$$

or, alternatively, $$p_{t,j}^{D*}(\lambda_j, \mu) = \arg\max_{p_{t,j}^D \geq 0} \log\left(1 + \frac{|h_j|^2 p_{t,j}^D}{\sigma^2 + I_j}\right) - \mu p_{t,j}^D - \lambda_j e^{\omega(p_{t,j}^D - \eta_j)}. \quad (24.1)$$

where $\{p_{t,j}^{D*}\}$ is the optimal power allocation for $(\{\lambda_j\}, \mu)$. Note that (24) is only valid for $b_j \geq c_j$ and for $b_j < c_j$ we have $p_{t,j}^{D*}(\lambda_j,\mu)=0$. The problem in (24) is a convex optimization problem, and thus the optimal value can be found very efficiently.

Note that equations 24 and 24.1 have slightly different notation in that equation 24 is recast with slightly different variables than the optimization problem set forth in equation 24.1.

As a first order approximation of the solution, the approximation $$e^{\omega_j(p_{t,j}^D - \eta_j)} \approx 1 + \omega_j(p_{t,j}^D - \eta_j)$$

can be used. Using this approximation and setting the differentiation of (24) to zero, $$\left(\frac{a_j b_j - a_j c_j}{(a_j + b_j p_{t,j}^D)(a_j + c_j p_{t,j}^D)} - \mu\right) e^{-\omega_j(p_{t,j}^D - \eta_j)} = \omega_j \lambda_j \quad (25)$$

or, alternatively, $$\frac{|h_j|^2}{\sigma^2 + I_j + |h_j|^2 p_{t,j}^D} - \mu - \omega\lambda_j = 0 \quad (25.1)$$

Note that equations 25 and 25.1 have slightly different notation in that equation 25 is recast with slightly different variables than equation 25.1.

In other words, $$(\omega_j\lambda_j + \mu)b_j c_j (p_{t,j}^D)^2 +$$
$$(\omega_j\lambda_j + \mu)a_j(b_j + c_j)p_{t,j}^D + ((\omega_j\lambda_j + \mu)a_j^2 - a_j b_j + a_j c_j) = 0$$

or equivalently $$\kappa_j (p_{t,j}^D)^2 + \beta_j p_{t,j}^D + \left(1 - \frac{\gamma_j}{(\omega_j\lambda_j + \mu)}\right) = 0$$

where $$\kappa_j \triangleq \frac{b_j c_j}{a_j^2} > 0,$$

$$\beta_j \triangleq \frac{b_j + c_j}{a_j} > 0 \text{ and}$$

$$\gamma_j \triangleq \frac{b_j - c_j}{a_j} > 0.$$

Summation of the roots of this equation is $$-\frac{\beta_j}{\kappa_j}$$

which is negative so there is at least one negative root. Thus, only the greater root can be accepted or otherwise the solution for (24) is zero. Thus:

$$p_{t,j}^{D*}(\lambda_j, \mu) \approx \left[\frac{-\beta_j + \sqrt{\beta_j^2 - 4\kappa_j\left(1 - \frac{\gamma_j}{(\mu + \omega_j\lambda_j)}\right)}}{2\kappa_j}\right]_+, \quad (26)$$

or, alternatively $$p_{t,j}^{D*}(\lambda_j, \mu) \approx \left[\frac{1}{(\mu + \omega\lambda_j)} - \frac{\sigma^2 + I_j}{|h_j|^2}\right]_+ \quad (26.1)$$

Note that equations 26 and 26.1 have slightly different notation in that equation 26 is recast with slightly different variables than equation 26.1.

The optimal value for $\{\lambda_j\}$ and $\mu$ can be found using the following convex optimization problem:

$$\min_{\{\lambda_j\},\mu} g(\{\lambda_j\}, \mu) \quad (27)$$

subject to $\lambda_j \geq 0, j \in C_l$ (28)

$\mu \geq 0.$ (29)

To solve (27), the Subgradient Method can be exploited. To achieve the subgradients, it is noted that:

$$g(\{\lambda_j'\}, \mu') = \max_{\{p_{t,j}^D \geq 0\}} L(\{p_{t,j}^D\}, \{\lambda_j'\}, \mu') \geq L(\{p_{t,j}^{D*}(\lambda_j, \mu)\}, \{\lambda_j'\}, \mu') = \quad (30)$$

$$g(\{\lambda_j\}, \mu) + \sum_{j \in C_l} (\lambda_j' - \lambda_j)(\varepsilon_j' - P_j E\{e^{\omega_j(p_{t,j}^{D*}(\lambda_j,\mu) - \eta_j)} \mid b_j \geq c_j\}) +$$

-continued $$(\mu' - \mu)\left(P_{max}^D - P_j E\left\{\sum_{j \in C_l} p_{t,j}^{D^*}(\lambda_j, \mu) | b_j \geq c_j\right\}\right).$$

Alternatively, $$g(\{\lambda'_j\}, \mu') = \max_{\{p_{t,j}^D\} \geq 0} \mathcal{L}(\{p_{t,j}^D\}, \{\lambda'_j\}, \mu') \geq \mathcal{L}(\{p_{t,j}^{D^*}(\lambda_j, \mu)\}, \{\lambda'_j\}, \mu') = \quad (30.1)$$

$$g(\{\lambda_j\}, \mu) + \sum_{j \in C_l} (\lambda'_j - \lambda_j)(\epsilon - \mathbb{E}\{e^{\omega(p_{t,j}^{D^*}(\lambda_j, \mu) - \eta_j)}\}) +$$

$$(\mu' - \mu)\left(P_{max}^D - \mathbb{E}\left\{\sum_{j \in C_l} p_{t,j}^{D^*}(\lambda_j, \mu)\right\}\right).$$

Note that equations 30 and 30.1 have slightly different notation in that equation 30 is recast with slightly different variables than equation 30.1.

By considering the definition of subgradients:

$$\partial \lambda_j = \varepsilon'_j - P_j E\{e^{\omega_j(p_{t,j}^{D^*}(\lambda_j, \mu) - \eta_j)} | b_j \geq c_j\} j \in C_l, \quad (31)$$

$$\partial \mu = P_{max}^D - \sum_{j \in C_l} P_j E\{p_{t,j}^{D^*}(\lambda_j, \mu) | b_j \geq c_j\}. \quad (32)$$

From (17) and (18) the subgradients can be re-written as $$\partial \lambda_j = \varepsilon - E\{e^{\omega_j(p_{t,j}^{D^*}(\lambda_j, \mu) - \eta_j)}\} j \in C_l, \quad (33)$$

$$\partial \mu = P_{max}^D - \sum_{j \in C_l} E\{p_{t,j}^{D^*}(\lambda_j, \mu)\}. \quad (34)$$

Thus, the value of Lagrange multipliers can be updated as follows:

$$\lambda_j[k+1] = (\lambda_j[k] - s_\lambda \partial \lambda_j[k])_+, j \in C_l, \quad (35)$$

$$\mu[k+1] = (\mu[k] - s_\mu \partial \mu[k])_+. \quad (36)$$

Where k is the iteration number and $s_\lambda$ and $s_\mu$ are step sizes.

Based on the equation in (24), the optimal power allocation in the kth step can be updated as follows:

$$p_{t,j}^{D^*}(\lambda_j[k], \mu[k]) = \quad (37)$$

$$\arg\max_{p_{t,j}^D \geq 0} \log\left(\frac{a_j + b_j p_{t,j}^D}{a_j + c_j p_{t,j}^D}\right) - \mu[k] p_{t,j}^D - \lambda_j[k] e^{\omega_j(p_{t,j}^D - \eta_j)},$$

and the value of dual function can be updated as follows:

$$g[k] \triangleq \sum_{j \in C_l} E\left\{\log\left(\frac{a_j + b_j p_{t,j}^{D^*}(\lambda_j[k], \mu[k])}{a_j + c_j p_{t,j}^{D^*}(\lambda_j[k], \mu[k])}\right)\right\} + \quad (38)$$

$$\mu[k]\left(P_{max}^D - \sum_{j \in C_l} E\{p_{t,j}^{D^*}(\lambda_j[k], \mu[k])\}\right) +$$

$$\sum_{j \in C_l} \lambda_j[k](\varepsilon - E\{e^{\omega_j p_{t,j}^{D^*}(\lambda_j[k], \mu[k]) - \eta_j)}\}).$$

After solving the equation (37)-(38) for a number of iterations, i.e., K iterations, $k' = \operatorname{argmin}_k g[k]$ can be found and the value of optimal Lagrange multipliers may be set as $\lambda^*_j = \lambda_j[k']$, for all $j \in C_{l^*}$, and $\mu^* = \mu[k']$. Then, in each channel state, the following optimization problem can be solved to find the optimal power allocation:

$$p_{t,j}^{D^*}[n] = \arg\max_{p_{t,j}^D \geq 0} \log\left(\frac{a_j + b_j p_{t,j}^D}{a_j + c_j p_{t,j}^D}\right) - \mu^* p_{t,j}^D - \lambda^*_j e^{\omega_j(p_{t,j}^D - \eta_j)}. \quad (39)$$

Note that considering (33) and (34), the above formulation can only be applied over the time it can be assumed the channel for D2D wireless device pairs is stationary.

Optimizing the value of $\omega_j$: The optimal value for $\omega_j$ may be found such that there is the tightest bound in (12). Thus, $$Pr\{p_{t,j}^D \geq \eta_j\} \leq \min_{\omega_j} E\{e^{\omega_j(p_{t,j}^D - \eta_j)}\} \leq E\{e^{\omega_j(p_{t,j}^D - \eta_j)}\} \quad (40)$$

To find the optimal $\omega_j$:

$$\frac{\partial}{\partial \omega_j} E\{e^{\omega_j(p_{t,j}^D - \eta_j)}\} = E\{(p_{t,j}^D - \eta_j) e^{\omega_j(p_{t,j}^D - \eta_j)}\} = 0. \quad (41)$$

The random variable is defined as $x_j = p_{t,j}^D - \eta_j$. The distribution of $x_j$ is not known before solving the optimization problem. If it is assumed that $x_j : N(m_j, \upsilon_j)$, then:

$$E\{x_j e^{\omega_j x_j}\} = \int_{-\infty}^{+\infty} x e^{\omega_j x} \frac{1}{\upsilon_j \sqrt{2\pi}} e^{-\frac{(x-m_j)^2}{2\upsilon_j^2}} dx = \quad (42)$$

$$e^{\frac{(\omega_j \upsilon_j^2 + m_j)^2 - m_j^2}{2\upsilon_j^2}} \int_{-\infty}^{+\infty} y \frac{1}{\upsilon_j \sqrt{2\pi}} e^{-\frac{(y-(\omega_j \upsilon_j^2 + m_j))^2}{2\upsilon_j^2}} dy = 0.$$

The integral in (42) is the mean value for the Gaussian random variable $y_j : N(\omega_j \upsilon_j^2 + m_j, \upsilon_j)$. Thus, from (42), the optimal value for $\omega_j$ can be found as $$\omega_j^{opt} = -\frac{m_j}{\upsilon_j^2}. \quad (43)$$

Since the distribution of $x_j$ is not known, an iterative method can be proposed in which, starting from an initial point for $\omega \triangleq [\omega_1, \omega_2, \ldots \omega_{|C_j|}]^T$, in each step the value of $\omega$ is updated for the next step by estimating $(m_j, \upsilon_j)$'s using the available information in the current step.

An Upper-Bound for the Original Optimization Problem

As discussed above, the Chernoff bound provides a lower bound for the original optimization problem in (9). The provided lower bound can be found by solving a convex optimization problem, i.e., (13). To see how good the lower bound is, a proper upper bound needs to be found for the optimization problem in (9) and the gap between the lower and upper bound considered. In this section, a method for reaching a proper upper bound is provided.

Lemma 1: For any nonnegative integrable random variable z and any positive value a, $$Pr\{z \le a\} \ge 1 - \frac{E\{y\}}{a}.$$

Proof: From Markov's inequity it is known that $$Pr\{z \ge a\} \le \frac{E\{z\}}{a},$$

thus $$1 = Pr\{z \ge a\} + Pr\{z \le a\} \le \frac{E\{z\}}{a} + Pr\{z \le a\}. \quad (44)$$

Theorem: For any $\omega_j \ge 0$ there is $$Pr\{p_{t,j}^D \ge \eta_j\} \ge 1 - E\{e^{-\omega_j(p_{t,j}^D - \eta_j)}\}.$$

Proof:

$$Pr\{p_{t,j}^D \ge \eta_j\} = Pr\{-\omega_j(p_{t,j}^D - \eta_j) \le 0\} = Pr\{e^{-\omega_j(p_{t,j}^D - \eta_j)} \le 1\}.$$

From Lemma 1:

$$Pr\{e^{-\omega(p_{t,j}^D - \eta_j)} \le 1\} \ge 1 - \frac{E\{e^{-\omega_j(p_{t,j}^D - \eta_j)}\}}{1} = 1 - E\{e^{-\omega_j(p_{t,j}^D - \eta_j)}\}. \quad (45)$$

By combining with the Chernoff Bound, for any $\omega_j > 0$, there is the following:

$$1 - E\{e^{-\omega_j(p_{t,j}^D - \eta_j)}\} \le \max_{\omega_j} 1 - E\{e^{-\omega_j(p_{t,j}^D - \eta_j)}\} \le \quad (46)$$

$$Pr\{p_{t,j}^D \ge \eta_j\} \le \min_{\omega_j} E\{e^{\omega_j(p_{t,j}^D - \eta_j)}\} \le E\{e^{\omega_j(p_{t,j}^D - \eta_j)}\}.$$

The optimization problem for finding the upper bound can be written as follows:

$$P4: \max_{\{p_{t,j}^D \ge 0\}} E\left\{\sum_{j \in C_l} \log\left(\frac{a_j + b_j p_{t,j}^D}{a_j + c_j p_{t,j}^D}\right)\right\} \quad (47)$$

$$\text{subject to } E\left\{\sum_{j \in C_l} p_{t,j}^D\right\} \le P_{max}^D \quad (48)$$

$$E\{1 - e^{-\omega_j^{opt}(p_{t,j}^D - \eta_j)}\} \le \varepsilon, j \in C_l. \quad (49)$$

Because the power constraint for the upper-bound problem is a concave constraint, the optimization is not a convex problem anymore. A dual problem analysis can be used to find the upper bound.

The Lagrange multiplier function of (47) can be written as:

$$L(\{p_{t,j}^D\}, \{\lambda_j\}, \mu) \triangleq \quad (50)$$

$$\sum_{j \in C_l} E\left\{\log\left(\frac{a_j + b_j p_{t,j}^D}{a_j + c_j p_{t,j}^D}\right)\right\} + \mu\left(P_{max}^D - \sum_{j \in C_l} E\{p_{t,j}^D\}\right) +$$

$$\sum_{j \in C_l} \lambda_j\left(\varepsilon - 1 + E\{e^{-\omega_j^{opt}(p_{t,j}^D - \eta_j)}\}\right) =$$

$$\sum_{j \in C_l} E\left\{\log\left(\frac{a_j + b_j p_{t,j}^D}{a_j + c_j p_{t,j}^D}\right) - \mu p_{t,j}^D + \lambda_j e^{-\omega_j^{opt}(p_{t,j}^D - \eta_j)}\right\} +$$

$$\mu P_{max}^D + \sum_{j \in C_l} \lambda_j(\varepsilon - 1).$$

The Lagrange dual function can be defined as:

$$g(\{\lambda_j\}, \mu) = \max_{\{p_{t,j}^D\} \ge 0} L(\{p_{t,j}^D\}, \{\lambda_j\}, \mu). \quad (51)$$

To find optimal $P_{t,j}^D$, for fixed values of $\lambda_j$ and $\mu$ and for $j \in C_l$, in (51), the following optimization problem needs to be solved for each j:

$$p_{t,j}^{D*}(\lambda_j, \mu) = \arg\max_{p_{t,j}^D \ge 0} \log\left(\frac{a_j + b_j p_{t,j}^D}{a_j + c_j p_{t,j}^D}\right) - \mu p_{t,j}^D + \lambda_j e^{-\omega_j^{opt}(p_{t,j}^D - \eta_j)}. \quad (52)$$

Note that (52) is not a convex optimization problem. Thus, an extremum-search method needs to be applied to find the global optimum point. After finding the global maximum point, to solve (51), the subgradient method can be exploited.

Optimizing the value of $\omega_j$: To find the optimal $\omega_j > 0$ for the upper bound, $$\frac{\partial}{\partial \omega_j}\left(1 - E\{e^{-\omega_j(p_{t,j}^D - \eta_j)}\}\right) = E\{(p_{t,j}^D - \eta_j)e^{-\omega_j(p_{t,j}^D - \eta_j)}\} = 0. \quad (53)$$

The random variable is defined as $x_j = p_{t,j}^D - \eta_j$. The distribution of $x_j$ is not known before solving the optimization problem. If it is assumed that $x_j : N(m_j, \upsilon_j)$, then, $$E\{x_j e^{\omega_j x_j}\} = \int_{-\infty}^{+\infty} x e^{-\omega_j x} \frac{1}{\upsilon_j \sqrt{2\pi}} e^{-\frac{(x-m_j)^2}{2\upsilon_j^2}} dx = \quad (54)$$

$$e^{\frac{(m_j - \omega_j \upsilon_j^2)^2 - m_j^2}{2\upsilon_j^2}} \int_{-\infty}^{+\infty} y \frac{1}{\upsilon_j \sqrt{2\pi}} e^{-\frac{(y-(m_j - \omega_j \upsilon_j^2))^2}{2\upsilon_j^2}} dy = 0.$$

The integral in (54) is the mean value for the random variable $y_j : N(m_j - \omega_j \upsilon_j^2, \upsilon_j)$. Thus, from (54), the optimal value for $\omega_j$ can be found as:

$$\hat{\omega}_j^{opt} = \frac{m_j}{v_j^2}. \tag{55}$$

Since the distribution of $x_j$ is not known, an iterative method can be proposed in which, starting from an initial point for $\omega \triangleq [\omega_1, \omega_2, \ldots, \omega_{|C_l|}]^T$, in each step the value of $\omega$ is updated for the next step by estimating $(m_j, v_j)$'s using the available information in the current step.

Heuristic Solutions: Time Averaging Instead of Statistical Mean

Calculating the subgradients in (33)-(34) needs statistical averaging over large number of communication channels which is highly computationally complex. To avoid high computational complexity, embodiments of the present disclosure use time averaging instead of statistical mean to calculate the subgradients. To do so, $E_n\{x\}$ is defined as the time average over n consecutive samples, i.e., $\{x_1, x_2, \ldots, x_n\}$. Using the definition of time averaging, an approximate of the subgradients in (33)-(34) is as follows:

$$\partial \lambda_j[n] = \varepsilon - E_n\left\{ e^{\omega_j(p_{t,j}^{D*} - \eta_j)} \right\} j \in C_l, \tag{56}$$

$$\partial \mu[n] = P_{max}^D - \sum_{j \in C_l} E_n\{p_{t,j}^{D*}\}. \tag{57}$$

where time-averaging is done over random $p_{t,j}^{D*}$ and we define $p_{t,j}^{D*}[n]$ as $$p_{t,j}^{D*}[n] = \arg\max_{p_{t,j}^D \geq 0} \log\left( \frac{a_j + b_j p_{t,j}^D}{a_j + c_j p_{t,j}^D} \right) - \mu[n] p_{t,j}^D - \lambda_j[n] e^{\omega_j(p_{t,j}^D - \eta_j)}. \tag{58}$$

Again, the Lagrange multipliers are updated as (35)-(36).

Heuristic Solutions: One Bit Feedback Information

To calculate the approximation in (56), information from all interfering cellular devices needs to be received. To decrease the amount of feedback information, each interfering cellular device can send one bit feedback information to show that up to the time of sending the feedback the SINR constraint is satisfied or violated. Based on this feedback information, a D2D wireless device can increase its power over the corresponding RB in order to maximize the objective function or decrease its power in order to satisfy the SINR constraint for interfering cellular devices. When the received feedback information is suggesting different power change directions, the priority goes to decreasing power over the corresponding RB to be sure that all of the SINR constraints are satisfied. In other words, considering the fact that $p_{t,j}^{D*}(\lambda_j, \mu)$ a decreasing function of $\lambda_j$, the following updating process can be used for the value of Lagrange multipliers:

$$\lambda_j[n+1] = (\lambda_j[n] - s_\lambda \text{sign}(\partial \lambda_j[n])), j \in C_l. \tag{59}$$

Using (59), sign information is used to decide about the direction of change in the power over each RB. The updating process for $\mu$ is the same as (36).

The idea of the heuristic method to apply time-averaging approximation in the primal domain can be applied to solve the problem proposed in this disclosure, i.e., (1).

Heuristic Solution

Algorithms for Finding the Best Cellular Match

Calculation of subgradients has a very high complexity and needs full information about the statistics of the channels between D2D wireless device pairs and also all interference channels. Instead of using the subgradient method to solve the dual problem, Lagrange multipliers can be directly found by approximating the primal problem. Considering the fact that $\mu$ is related to the constraint $\mathbb{E}\{\Sigma_{j \in C_l} p_{t,j}^D\} \leq p_{max}^D$, in each step $\mu[n+1]$ can be found by connecting it to $\mathbb{E}_{n+1}\{\Sigma_{j \in C_l} p_{t,j}^D\} \leq P_{max}^D$. It can be shown that $$\mathbb{E}_{n+1}\{x\} = \frac{1}{n+1}(x[n+1] + n\mathbb{E}_n\{x\}).$$

Thus, the sum power constraint in (11) can be written as $$\sum_{j \in C_l} p_{t,j}^D[n+1] \leq (n+1)P_{max}^D - n\mathbb{E}_n\left\{\sum_{j \in C_l} p_{t,j}^D = P_{max}'^D[n+1]\right\}. \tag{60}$$

Similarly, the individual power constraints in (33) can be approximated as $$p_{t,j}^D[n+1] \leq \tag{61}$$

$$n_j[n+1] + \frac{1}{\omega}\log\left((n+1)\varepsilon - n\mathbb{E}_n\left\{e^{\omega(p_{t,j}^D - \eta_j)}\right\}\right) = \eta'_j[n+1].$$

If $\Sigma_{j \in C_l} \eta'_j[n+1] \leq P'^D_{max}[n+1]$ it can be shown that the optimal solution is $p_{t,j}^{D*}[n] = \eta'_j[n+1]$. Otherwise, after applying the KKT optimality condition to the primal problem:

$$p_{t,j}^{D*}[n] = \left[\frac{1}{\mu[n]} - \frac{\sigma^2 + I_j}{|h_j|^2}\right]_0^{\eta'_j[n]}. \tag{62}$$

Note that $\mu[n]$ may be found such that $\Sigma_{j \in C_l} p_{t,j}^D[n] \leq P'^D_{max}[n]$, which can be achieved using the bisection method.

Algorithms for Finding the Best Cellular Match

For the proposed method in the previous section, it is assumed that it is known that each D2D wireless device pair is matched with a specific cellular wireless device and that the power allocation problem has been solved based on this assumption. To obtain a complete scheduling method, another algorithm for choosing the best cellular match is proposed. Using the optimal method proposed in the previous sections, the best cellular match can be chosen through solving separate optimization problems for all cellular wireless devices in the cell. However, this has a high computational complexity and needs full statistics of all involved channels. In reality, complete information about the channel realizations is often not known beforehand, and, also, time constraints may limit the ability to gather full channel statistics. Thus, to find the best cellular match, a sub-optimal algorithm based on solving the following optimization problem is proposed:

$$\max_{\{p_{t,j}^D\} \geqslant 0} \sum_{i=1}^{N} \sum_{j \in C_i} \alpha_i \log\left(\frac{|h_j|^2 p_{t,j}^D}{\sigma^2 + \bar{I}_j}\right) \quad (63\text{-}1)$$

$$\text{subject to } \alpha_i \in \{0, 1\}, i = 1, 2, \ldots, N \quad (63\text{-}2)$$

$$\sum_{i=1}^{N} \alpha_i \leq 1, \quad (63\text{-}3)$$

$$\sum_{i=1}^{N} \sum_{j \in C_i} \alpha_i p_{t,j}^D \leq P_{max}^D \quad (63\text{-}4)$$

$$e^{\omega(p_{t,j}^D - \overline{\eta_j})} \leq \epsilon, \; j \in C_i, \forall \, i. \quad (63\text{-}5)$$

In (63-1) through (63-5), average values are used to find the best cellular match for the D2D wireless device pair. It is a reasonable choice due to the lack of full statistics of all channels. It is defined that $$\overline{\eta}'_j = \overline{\eta}_j + \frac{1}{\omega}\log(\epsilon),$$

for all $j \in C_l$. Assuming the $l^{th}$ cellular wireless device is the best cellular match, the solution for the optimization problem in (19) can be found using a KKT optimality condition as:

Case 1)

$$\sum_{j \in C_l} \overline{\eta}_j \leq P_{max}^D: \; p_{t,j}^D = \overline{\eta}_j \; (\text{for all } j \in C_l). \quad (64)$$

Case 2)

$$\sum_{j \in C_l} \overline{\eta}_j > P_{max}^D: \; p_{t,j}^D = \left[\frac{1}{\mu^{(0)}} - \frac{\sigma^2 + \bar{I}_j}{|h_j|^2}\right]_0^{\overline{\eta}_j}$$

where $\mu^{(0)} > 0$ may be found such that $\Sigma_{j \in C_l} p_{t,j}^D = P_{max}^D$. Because $p_j$ is a decreasing function of $\mu^{(0)}$, the bisection method can be used to efficiently find the optimal $\mu^{(0)}$. If the new D2D wireless device pair is matched with the $l^{th}$ cellular wireless device, the achievable rate for the new D2D wireless device pair will be:

$$R_l = \sum_{j \in C_l} \log\left(1 + \frac{|h_j|^2 p_{t,j}^D}{\sigma^2 + \bar{I}_j}\right). \quad (65)$$

After finding $R_l$, for all $l \in \{1, 2, \ldots, N\}$, the D2D wireless device pair is matched with the $l^{*th}$ cellular wireless device, where $$l^* = \underset{l}{\operatorname{argmax}} R_l.$$

In accordance with the disclosure:
The long-term throughput of D2D wireless device pairs is improved under a long-term sum-power constraint and long-term individual power constraints over each RB.

A long-term constraint on the sum-power of D2D wireless device pairs is assured, which is directly related to the battery energy consumption of D2D wireless device pairs.

For cellular wireless devices that share RBs with the D2D wireless device pair, by applying individual power constraints, a specific SINR level is achieved with a preset probability.

The method and arrangements according to some embodiments of the present disclosure are applicable to a realistic cellular environment, i.e., multiple cellular and D2D nodes in the network, resource reuse factor (effects from/to the neighboring cells), and access to multiple RBs.

The method and arrangements according to some embodiments of the present disclosure are applicable to both uplink and downlink resource sharing at the same time. Due to the localized nature of D2D communication, as well as low power transmission for D2D wireless device pairs, only the resource allocation problem for D2D wireless device pairs is solved. The resource allocation and power control of existing wireless devices in the network are not modified.

The method and arrangements according to some embodiments of the present disclosure provide an efficient suboptimal algorithm for finding the best cellular match for the D2D wireless device transmissions.

Figure 6:
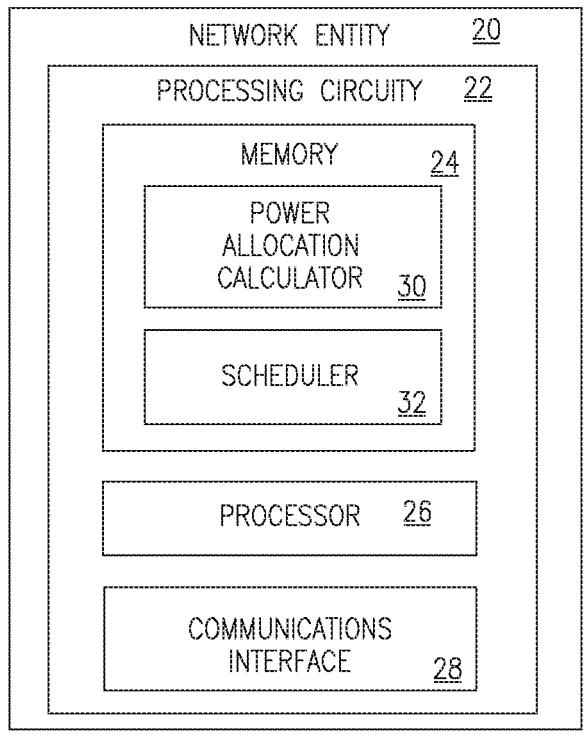
FIG. 6 is a block diagram of an exemplary network device configured to schedule a D2D wireless device.

FIG. 6 is a block diagram of an exemplary network entity 20 configured to schedule a D2D device using RBs for existing cellular devices 16 in wireless network. In one embodiment, network entity 20 is a base station that has been modified to implement the features and functions described herein. In one or more embodiments, network entity 20 includes processing circuitry 22, memory 24, a processor 26, and a communications interface 28. Memory 24 contains instructions that, when executed by processor 26, configure processor 26 to perform one or more functions described with respect to FIGS. 8 and 9 and herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processor 26 may be configured to access (e.g., write to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 26 and/or other data, e.g., data pertaining to communication, e.g., configuration and/or address data of nodes, etc.

Processing circuitry 22 may be configured to control any of the methods and/or processes described herein and/or to cause such methods and/or processes to be performed, e.g., by network entity 20. Corresponding instructions may be stored in the memory 24, which may be readable and/or readably connected to processor 26. In other words, processing circuitry 22 may comprise a microprocessor and/or microcontroller and/or FPGA (Field-Programmable Gate Array) device and/or ASIC (Application Specific Integrated Circuit) device.

Memory 24 includes instructions that, when executed by processor 26, configure processor 26 to determine a power allocation for each of the RBs based on achieving a long term target rate for the D2D wireless device 14. This determination may be performed by power allocation calculator 30 along with processor 26. Processor 26 may also be configured to schedule the D2D wireless device 14 based on the determined power allocation. This scheduling function may be performed by scheduler 32 along with processor 26.

In one or more embodiments, processor 26 is further configured to determine a cellular wireless device 16 of the active cellular wireless devices to be matched with the D2D wireless device 14 pair, allow the D2D wireless device 14 to share all RBs allocated to the cellular wireless device 16 that is matched with the D2D wireless device 14 pair, determine a power allocation for each RB of the allocated RBs based on achieving a long term target rate for the D2D wireless device 14 and the cellular wireless device 16 to which the D2D wireless device 14 pair is matched, and schedule the D2D wireless device 14 based on the allocated RBs based on the determined power allocation.

In one or more embodiments, achieving the long term target rate for the D2D wireless device 14 and the cellular device 16 to which the D2D wireless device 14 pair is matched satisfies constraints on a long term power of the D2D wireless device 14 and a SINR of interfering cellular wireless devices 16 in one of a main cell and a neighboring cell.

In one or more embodiments, processor 26 is further configured to obtain feedback information from each interfering cellular device 16 in one of a main cell and a neighboring cell, and communications interface 28 is further configured to at least one of forwarding the feedback information to the D2D wireless device 14 and instructing the D2D wireless device 14 to adjust its power over each RB based on the feedback information.

In one or more embodiments, if the feedback information indicates conflicting power adjustments over each RB, processor 26 is further configured to instruct the D2D wireless device to at least one of decrease power over each RB in order to satisfy constraints on a SINR of interfering cellular wireless devices 16 in one of a main cell and a neighboring cell and increase power over each RB in order to satisfy constraints on a SINR of interfering cellular wireless devices 16 in one of a main cell and a neighboring cell. In one or more embodiments, the feedback information is comprised of one data bit.

In one or more embodiments, adjusting the power over each RB includes one of increasing the power over each RB which satisfies constraints on long term power, and decreasing the power over each RB which satisfies constraints on a SINR of interfering cellular wireless devices 16 in one of a main cell and a neighboring cell.

In one or more embodiments, processor 26 is further configured to determine a sign of a subgradient value which is related to SINR constraints of interfering cellular wireless devices 16 in one of a main cell and a neighboring cell, the determining based the feedback information.

In one or more embodiments, processor 26 is further configured to use time averaging as an approximation for statistical mean to approximate the subgradient value. In one or more embodiments, processor 26 is further configured to calculate a target level of power over each RB of the allocated RBs to meet a time averaged, SINR for an interfering cellular wireless device 16 in one of a main cell and a neighboring cell. In one or more embodiments, wherein the target level of power is calculated to meet the time averaged SINR with a pre-specified probability. In one or more embodiments, processor 26 is further configured to use average channel measurements over a predetermined period of time to determine the cellular wireless device 16 to be matched with the D2D wireless device 14 pair.

Figure 7:
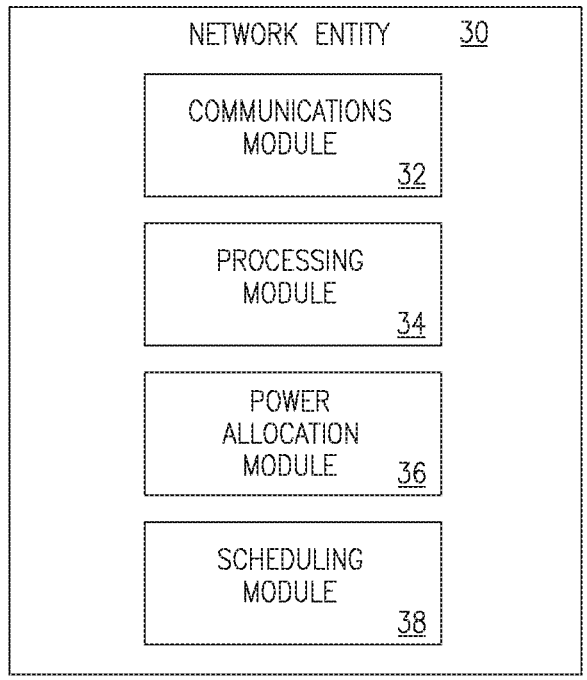
FIG. 7 is a block diagram of an alternative network device configured to schedule a D2D wireless device.

FIG. 7 is a block diagram of an alternative network device configured to schedule a D2D wireless device using RBs for existing cellular devices 16 in a wireless network. A network entity 30 is configured to schedule a D2D wireless device 14 using RBs of active cellular wireless devices 16 in a wireless network. In one embodiment, network entity 30 includes a communications module 38 and a processing module 34. Network entity 30 also includes a power allocation module 36 configured to determine a power allocation for each of the RBs based on achieving a long term target rate for the D2D wireless device 14 and the active cellular wireless devices 16 and a scheduling module 38 configured to schedule the D2D wireless device 14 based on the determined power allocation.

Figure 8:
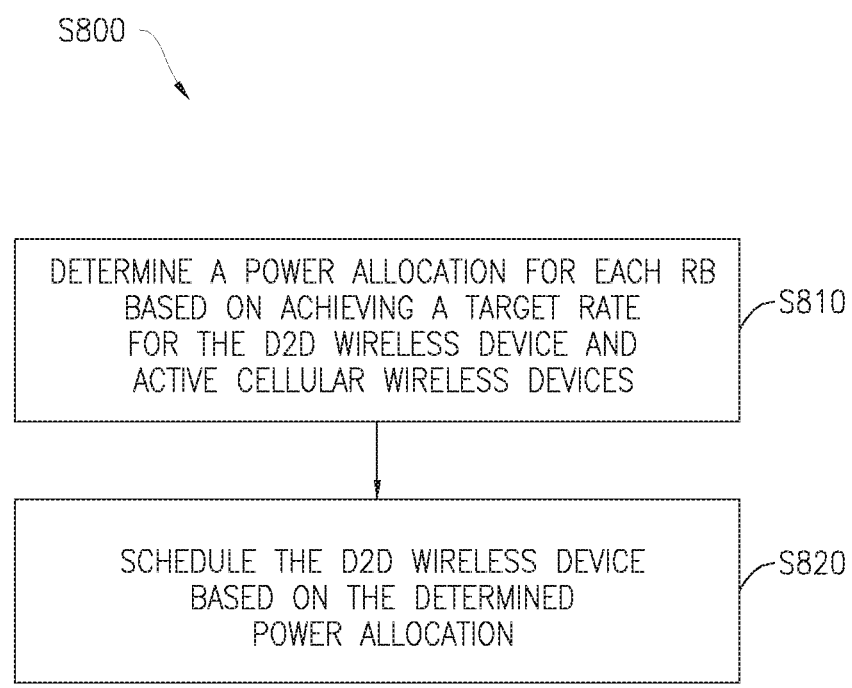
FIG. 8 is a flowchart illustrating an exemplary process for scheduling a D2D wireless device.

FIG. 8 is a flowchart illustrating an exemplary process (S800) for scheduling a D2D wireless device 14 using RBs of active cellular wireless devices 16 in a wireless network, according to the principles of the present disclosure. The method includes determining a power allocation for each of the RBs based on achieving a long term target rate for the D2D wireless device 14 and the active cellular wireless devices 16 (block S810) and scheduling the D2D wireless device 14 based on the determined power allocation (block S820). These functions may be performed by processor 26 of network entity 20.

Figure 9:
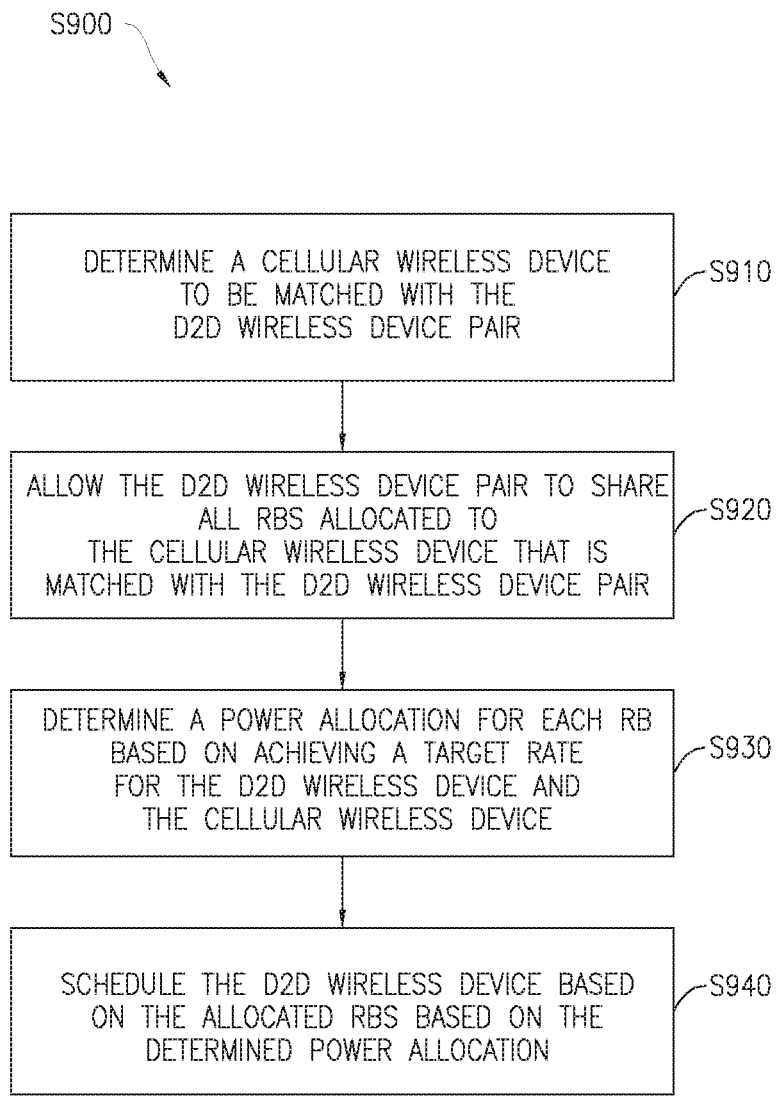
FIG. 9 is a flowchart illustrating another embodiment of an exemplary process for scheduling a D2D wireless device.

FIG. 9 is a flowchart illustrating another embodiment of an exemplary process (S900) for scheduling a D2D wireless device 14 using RBs of active cellular wireless devices 16 in a wireless network according to the principles of the present disclosure. In FIG. 9, it is determined, by processor 26, that a cellular wireless device 16 of active cellular wireless devices is to be matched with a D2D wireless device 14 pair (block S910). The D2D wireless device 14 is allowed to share all RBs allocated to the cellular wireless device 16 that is matched with the D2D wireless device 14 pair (block S920). This can also be performed by processor 26 of network entity 20. Power allocation calculator 30 either alone or in conjunction with processor 26 determines the power allocation for each RB of the allocated RBs based on achieving a target rate for the D2D wireless device 14 and the cellular wireless device 16 to which the D2D wireless device 14 pair is matched (block S930). Scheduler 32 either alone or in conjunction with processor 26 schedules the D2D wireless device 14 based on the allocated RBs based on the determined power allocation (block S940).

In one or more embodiments of the processes illustrated in FIG. 8 and FIG. 9, achieving the target rate for the D2D wireless device 14 and the cellular device 16 to which the D2D wireless device 14 pair is matched satisfies constraints on a power of the D2D wireless device 14 and a SINR of interfering cellular wireless devices 16 in one of a main cell and a neighboring cell.

In one or more embodiments, the process further includes obtaining feedback information from each interfering cellular device 16 in one of a main cell and a neighboring cell, and at least one of forwarding the feedback information to the D2D wireless device 14 and instructing the D2D wireless device 14 to adjust power over each RB based on the feedback information. This function may be performed by processor 26 of network entity 20.

In one or more embodiments, if the feedback information indicates conflicting power adjustments over each RB, the process further includes instructing the D2D wireless device 14 to at least one of decrease power over each RB in order to satisfy constraints on a SINR of interfering cellular wireless devices 16 in one of a main cell and a neighboring cell and increase power over each RB in order to satisfy constraints on a SINR of interfering cellular wireless devices 16 in one of a main cell and a neighboring cell. This function may be performed by processor 26 of network entity 20. In one or more embodiments, the feedback information is comprised of one data bit.

In one or more embodiments, the power over each RB includes one of increasing the power over each RB which satisfies constraints on power, and decreasing the power over each RB which satisfies constraints on a SINR of interfering cellular wireless devices 16 in one of a main cell and a neighboring cell. This function may be performed by processor 26 of network entity 20.

In one or more embodiments, the process further includes determining a sign of a subgradient value which is related to SINR constraints of interfering cellular wireless devices 16 in one of a main cell and a neighboring cell, the determining based on the feedback information. In one or more embodiments, the process further includes using time averaging as an approximation for statistical mean to approximate the subgradient value. These functions may be performed by processor 26 of network entity 20.

In one or more embodiments, the process further includes calculating a target level of power over each RB of the allocated RBs to meet a time averaged SINR for an interfering cellular wireless device 16 in one of a main cell and a neighboring cell. In one or more embodiments, the target level of power is calculated to meet the time averaged SINR with a pre-specified probability. In one or more embodiments, the process includes using average channel measurements over a predetermined period of time to determine the cellular wireless device 16 to be matched with the D2D wireless device 14 pair. These functions may be performed by processor 26 of network entity 20.

Although the disclosure describes implementing the process using a processor and a memory, embodiments are not limited to such. It is contemplated that embodiments performing the functions and calculations can be implemented using programmable gate arrays (PGAs), application specific integrated circuits (ASICs), and the like. Further, although embodiments are described using a base station, it is contemplated that the process steps can be performed in other network entities and even distributed across multiple network entities.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for scheduling a device-to-device, D2D, wireless device using resource blocks, RBs, of active cellular wireless devices in a wireless network, the method comprising:
   determining a power allocation for each of the RBs based on achieving a target rate for the D2D wireless device and the active cellular wireless devices, the RBs of the D2D wireless devices being shared with the active cellular wireless devices;
   scheduling the D2D wireless device on the shared RBs based on the determined power allocation;
   obtaining feedback information from each interfering cellular device in one of a main cell and a neighboring cell, the feedback information is comprised of one data bit; and
   at least one of forwarding the feedback information to the D2D wireless device and instructing the D2D wireless device to adjust power over each RB based on the feedback information.

2. The method of claim 1, further comprising:
   determining a cellular wireless device of the active cellular wireless devices to be matched with a D2D wireless device pair;
   allowing the D2D wireless device to share all RBs allocated to the cellular wireless device that is matched with the D2D wireless device pair;
   determining a power allocation for each RB of the allocated RBs based on achieving a target rate for the D2D wireless device and the cellular wireless device to which the D2D wireless device pair is matched; and
   scheduling the D2D wireless device based on the allocated RBs based on the determined power allocation.

3. The method of claim 2, wherein achieving the target rate for the D2D wireless device and the cellular device to which the D2D wireless device pair is matched satisfies constraints on a power of the D2D wireless device and a signal to noise-plus-interference ratio, SINR, of interfering cellular wireless devices in one of a main cell and a neighboring cell.

4. The method of claim 2, further comprising calculating a target level of power over each RB of the allocated RBs to meet a time averaged signal to noise-plus-interference ratio, SINR, for an interfering cellular wireless device in one of a main cell and a neighboring cell.

5. The method of claim 4, wherein the target level of power is calculated to meet the time averaged SINR with a pre-specified probability.

6. The method of claim 2, further comprising using average channel measurements over a predetermined period of time to determine the cellular wireless device to be matched with the D2D wireless device pair.

7. The method of claim 1, wherein adjusting the power over each RB includes one of increasing the power over each RB which satisfies constraints on power, and decreasing the power over each RB which satisfies constraints on a signal to noise-plus-interference ratio, SINR, of interfering cellular wireless devices in one of a main cell and a neighboring cell.

8. The method of claim 1, further comprising determining a sign of a subgradient value which is related to signal to noise-plus-interference ratio, SINR, constraints of interfering cellular wireless devices in one of a main cell and a neighboring cell, the determining based on the feedback information.

9. The method of claim 8, further comprising using time averaging as an approximation for statistical mean to approximate the subgradient value.

10. The method of claim 1, wherein if the feedback information indicates conflicting power adjustments over each RB, further comprising instructing the D2D wireless device to at least one of decrease power over each RB in order to satisfy constraints on a signal to noise-plus-interference ratio, SINR, of interfering cellular wireless devices in one of a main cell and a neighboring cell and increase power over each RB in order to satisfy constraints on a SINR of interfering cellular wireless devices in one of a main cell and a neighboring cell.

11. A network entity configured to schedule a device-do-device, D2D, wireless device using resource blocks, RBs, of active cellular wireless devices in a wireless network, the network entity comprising:
   a communications interface; and
   processing circuitry including a memory and a processor, the memory in communication with the processor, the memory having instructions that, when executed by the processor, configure the processor to:
      determine a power allocation for each of the RBs based on achieving a target rate for the D2D wireless device and the active cellular wireless devices, the RBs of the D2D wireless devices being shared with the active cellular wireless devices;
      schedule the D2D wireless device on the shared RBs based on the determined power allocation;
      obtain feedback information from each interfering cellular device in one of a main cell and a neighboring cell, the feedback information is comprised of one data bit; and
      at least one of forward the feedback information to the D2D wireless device and instruct the D2D wireless device to adjust power over each RB based on the feedback information.

12. The network entity of claim 11, wherein the processor is further configured to determine a sign of a subgradient value which is related to signal to noise-plus-interference ratio, SINR, constraints of interfering cellular wireless devices in one of a main cell and a neighboring cell, the determining based the feedback information.

13. The network entity of claim 12, wherein the processor is further configured to use time averaging as an approximation for statistical mean to approximate the subgradient value.

14. The network entity of claim 11, wherein the processor is further configured to:
   determine a cellular wireless device of the active cellular wireless devices to be matched with a D2D wireless device pair;
   allow the D2D wireless device to share all RBs allocated to the cellular wireless device pair that is matched with the D2D wireless device;
   determine a power allocation for each RB of the allocated RBs based on achieving a target rate for the D2D wireless device and the cellular wireless device to which the D2D wireless device pair is matched; and
   schedule the D2D wireless device based on the allocated RBs based on the determined power allocation.

15. The network entity of claim 14, wherein achieving the target rate for the D2D wireless device and the cellular device to which the D2D wireless device pair is matched satisfies constraints on a power of the D2D wireless device and a signal to noise-plus-interference ratio, SINR, of interfering cellular wireless devices in one of a main cell and a neighboring cell.

16. The network entity of claim 14, wherein the processor is further configured to calculate a target level of power over each RB of the allocated RBs to meet a time averaged signal to noise-plus-interference ratio, SINR, for an interfering cellular wireless device in one of a main cell and a neighboring cell.

17. The network entity of claim 16, wherein the target level of power is calculated to meet the time averaged SINR with a pre-specified probability.

18. The network entity of claim 14, wherein the processor is further configured to use average channel measurements over a predetermined period of time to determine the cellular wireless device to be matched with the D2D wireless device pair.

19. The network entity of claim 11, wherein adjusting the power over each RB includes one of increasing the power over each RB which satisfies constraints on power, and decreasing the power over each RB which satisfies constraints on a signal to noise-plus-interference ratio, SINR, of interfering cellular wireless devices in one of a main cell and a neighboring cell.

20. The network entity of claim 11, wherein if the feedback information indicates conflicting power adjustments over each RB, the processor is further configured to instruct the D2D wireless device to at least one of decrease power over each RB in order to satisfy constraints on a signal to noise-plus-interference ratio, SINR, of interfering cellular wireless devices in one of a main cell and a neighboring cell and increase power over each RB in order to satisfy constraints on a SINR of interfering cellular wireless devices in one of a main cell and a neighboring cell.

* * * * *